(12) United States Patent
Kim et al.

(10) Patent No.: US 8,525,965 B2
(45) Date of Patent: Sep. 3, 2013

(54) LIQUID CRYSTAL DISPLAY PANEL WITH UNIT PIXELS HAVING SLITS IN PIXEL ELECTRODE AND PHOTO ALIGNMENT LAYERS

(75) Inventors: Young-Gu Kim, Hwaseong-si (KR); Jin-Soo Jung, Hwaseong-si (KR); Hak-Sun Chang, Yongin-si (KR); Hee-June Kwak, Yongin-si (KR)

(73) Assignee: Samsung Display Co., Ltd, Gyeonggi-Do (KR)

( * ) Notice: Subject to any disclaimer, the term of this patent is extended or adjusted under 35 U.S.C. 154(b) by 153 days.

(21) Appl. No.: 13/213,340

(22) Filed: Aug. 19, 2011

(65) Prior Publication Data

US 2012/0133872 A1   May 31, 2012

(30) Foreign Application Priority Data

Nov. 29, 2010 (KR) .................. 10-2010-0120086

(51) Int. Cl.
*G02F 1/1343* (2006.01)
*G02F 1/1337* (2006.01)

(52) U.S. Cl.
USPC ............ 349/144; 349/129; 349/128; 349/146

(58) Field of Classification Search
USPC .................. 349/144, 128, 129, 146
See application file for complete search history.

(56) References Cited

U.S. PATENT DOCUMENTS

| 7,023,516 | B2 * | 4/2006 | Yoshida et al. ............... 349/143 |
| 8,045,112 | B2 * | 10/2011 | Lee et al. ...................... 349/129 |
| 8,054,429 | B2 * | 11/2011 | Hanaoka et al. ............. 349/129 |
| 2010/0034989 | A1 * | 2/2010 | Choi et al. ................... 428/1.26 |
| 2010/0157223 | A1 * | 6/2010 | Shin et al. .................... 349/129 |

\* cited by examiner

*Primary Examiner* — Mike Qi
(74) *Attorney, Agent, or Firm* — F. Chau & Associates, LLC

(57) ABSTRACT

A unit pixel of a liquid crystal display panel includes a plurality of domains formed using a photoalignment process technology. The domains have different domain alignment vectors, and major axes of liquid crystal molecules on alignment layers are aligned in parallel to transmission axes of the liquid crystal display panel. In addition, the unit pixel has a pixel electrode including slits. The slits have a slit angle at which the slits cross alignments of the domains at a predetermined angle, and the slit angle is less than 45°. As a result, transmittance of the unit pixel may increase, ensuring high image quality.

24 Claims, 24 Drawing Sheets

LIQUID CRYSTAL DISPLAY PANEL WITH UNIT PIXELS HAVING SLITS IN PIXEL ELECTRODE AND PHOTO ALIGNMENT LAYERS

CROSS-REFERENCE TO RELATED APPLICATION

This application claims priority under 35 U.S.C. §119(a) to a Korean Patent Application filed in the Korean Intellectual Property Office on Nov. 29, 2010 and assigned Serial No. 10-2010-0120086, the disclosure of which is incorporated by reference herein in its entirety.

BACKGROUND OF THE INVENTION

1. Technical Field

The present invention relates to a liquid crystal display panel, and more particularly, to a liquid crystal display panel with unit pixels, each unit pixel having slits in a pixel electrode and photo alignment layers.

2. Discussion of the Related Art

A liquid crystal display module includes a liquid crystal display panel that displays images by changing an arrangement of liquid crystal molecules according to a received electric signal, a backlight assembly supplying light to the liquid crystal display panel, and cases in which the liquid crystal display panel and the backlight assembly are fixed to each other.

The liquid crystal display panel includes a plurality of pixels arranged in the form of a matrix in rows and columns. Each of the pixels includes a pair of upper and lower glass substrates facing each other, a pair of polarizers which are formed on outer surfaces of the upper and lower glass substrates, respectively, a liquid crystal layer sealed and interposed between the upper and lower glass substrates, a pixel electrode formed on an inner surface of the lower glass substrate, a common electrode formed on an inner surface of the upper glass substrate, and alignment layers formed on the common electrode and the pixel electrode. In a color liquid crystal display panel, color filters having the primary colors including, for example, a set of red, green and blue (R, G, B), or a set of red, green, blue, and at least one selected from cyan, yellow, magenta and white, are found on pixel electrodes of the pixels, or on common electrodes corresponding to the pixel electrodes. A set of adjacent pixels in, for example, a row, representing each of the primary colors (e.g., R, G, and B) may be referred to as one pixel and each of the adjacent pixels, representing one of the primary colors, may be called a subpixel. In this specification, a "unit pixel" or a "pixel" means a subpixel in the case of a color liquid crystal display panel, that is, one of the adjacent pixels representing one of the primary colors.

It is desired that images displayed on a liquid crystal display panel show the same display qualities even though they are viewed in several different viewing directions or viewing angles. To achieve the same display qualities, a method of expanding a viewing angle of the liquid crystal display panel, by making liquid crystal molecules have similar refractive index anisotropy characteristics (or similar anisotropic characteristics in terms of the refractive index) in several different viewing directions, has been used. The method has been applied to Vertical Alignment (VA) mode and Plane to Line Switching (PLS) mode LCDs. In the VA mode, the method is based on how well the liquid crystal molecules in a liquid crystal layer are vertically arranged with respect to the substrates, and in the PLS mode, the method is based on how well the liquid crystal molecules in the liquid crystal layer are horizontally arranged with respect to the substrates.

In order to obtain a VA-mode liquid crystal display panel having improved viewing angle, a photoalignment process has been developed. The photoalignment process permits maintenance of constant gradation levels in wide viewing angles by dividing a unit pixel into a plurality of domains and making liquid crystal molecules of each domain have different pretilt directions when no voltage is applied to liquid crystal molecules.

FIG. 1A is an enlarged schematic conceptual diagram illustrating first and second alignment layers of a conventional unit pixel and alignment vectors of liquid crystal molecules, formed thereon. A unit pixel 100 has first and second substrates 101 and 103 facing each other. The first substrate 101 has a first underlying substrate 401 and a first alignment layer 110 disposed on the first underlying substrate 401, and the second substrate 103 has a second underlying substrate 403 and a second alignment layer 120 disposed on the second underlying substrate 403.

Although not shown in FIG. 1A, it may be understood by those of ordinary skill in the art that polarizers perpendicularly crossing polarization or transmission axes 111 and 121 may be formed on outer surfaces of the first and second underlying substrates 401 and 403, respectively; that a thin film transistor and a transparent pixel electrode for applying a pixel voltage to the unit pixel may be formed between the first underlying substrate 401 and the first alignment layer 110; and that a color filter layer representing any one of the primary colors may be formed between the second underlying substrate 403 and the second alignment layer 120.

To describe alignment directions, the X-Y-Z three-dimensional coordinate system is illustrated in FIG. 1A. Principal axes or major axes of liquid crystal molecules on the first alignment layer 110 are perpendicular to the x-y plane, and have first and second alignment vectors 310 and 320. The first and second alignment vectors 310 and 320 represent alignments whose pretilts are oppositely directed along the x-axis. The alignments are pretilted on planes that are parallel to the x-z plane and perpendicular to the x-y plane. The first and second alignment vectors 310 and 320 are parallel to the first transmission axis 111 of a polarizer formed on the first substrate 101. Similarly, principal axes or major axes of liquid crystal molecules on the second alignment layer 120 are perpendicular to the x-y plane, and have third and fourth alignment vectors 330 and 340. The third and fourth alignment vectors 330 and 340 represent alignments whose pretilts are oppositely directed along the y-axis. The alignments are pretilted on planes that are parallel to the y-z plane and perpendicular to the x-y plane. The third and fourth alignment vectors 330 and 340 are parallel to the second transmission axis 121 of a polarizer formed on the second substrate 103.

Therefore, the first and second alignment vectors 310 and 320 are perpendicular to the third and fourth alignment vectors 330 and 340. Such alignment vectors may be made by sequentially arranging masks in predetermined regions on alignment layers and irradiating light, such as polarized ultraviolet (UV) light, to be tilted with respect to the masks. The processes for forming the alignment vectors are disclosed in United States Patent Application Publication No. 2010-0157223 published on Jun. 24, 2010, and United States Patent Application Publication No. 2010-0034989 published on Feb. 11, 2010, both of which are commonly assigned to the owner of this application, and incorporated by reference herein.

Liquid crystal molecules are pre-tilted when the principal axes of liquid crystal molecules adjacent to an alignment layer are tilted in a predetermined direction with respect to a direction perpendicular to the surface of the alignment layer. In order to effectuate pretilt, the liquid crystal molecules may be physically bonded with the material of the alignment layer. A pretilt angle refers to an angle at which the pretilt is made with respect to the direction perpendicular to the surface of the alignment layer. In other words, the pretilt angle refers to the degree of pretilt.

FIG. 1B is an enlarged conceptual diagram illustrating locations and directions of domain alignment vectors of a unit pixel, made by a sum of the alignment vectors of the first and second alignment layers in FIG. 1A. FIG. 1B is a plan view, (i.e., seen above the unit pixel 100 in FIG. 1A), and illustrates first to fourth domain alignment vectors 360, 370, 380, and 390. In FIG. 1B, the first domain alignment vector 360 is the sum of the first and fourth alignment vectors 310 and 340, and is formed in a first domain 210. The second domain alignment vector 370 is the sum of the first and third alignment vectors 310 and 330, and is formed in a second domain 220. The third domain alignment vector 380 is the sum of the second and third alignment vectors 320 and 330, and is formed in a third domain 230. The fourth domain alignment vector 390 is the sum of the second and fourth alignment vectors 320 and 340, and is formed in a fourth domain 240.

Therefore, the domain alignment vectors cross the x-axis or y-axis of the x-y plane at an angle of 45°. The first transmission axis 111 of a first polarizer (not shown) formed under the first underlying substrate 401 is parallel to the x-axis, while the second transmission axis 121 of a second polarizer (not shown) formed under the second underlying substrate 403 is parallel to the y-axis, which is perpendicular to the x-axis. Hence, the domain alignment vectors cross the transmission axes 111 and 121 at an angle of 45°.

FIGS. 1C and 1D are enlarged schematic conceptual diagrams illustrating arrangements of liquid crystal molecules when a low-gradation level voltage and a high-gradation level voltage are applied to a liquid crystal layer in a micro region I shown in the fourth domain 240 of FIG. 1B, respectively. Liquid crystal molecules 610 in FIGS. 1C and 1D are divided into liquid crystal molecules 611 and 613 adjacent to the first and second alignment layers 110 and 120, and liquid crystal molecules 612, 614, and 615 situated in the central portion of the liquid crystal layer.

Pretilts and pretilt angles of the principal axes of the liquid crystal molecules 611 and 613 adjacent the alignment layers are predetermined by the liquid crystal molecules physically bonding with molecules of the alignment layers using the alignment technologies, such as those described above. The pretilts and pretilt angles of the alignment layer-adjacent liquid crystal molecules 611 and 613 are determined by the alignment vectors 310, 320, 330, and 340 of the first and second alignment layers 110 and 120, regardless of the strength of a pixel voltage or an electric field applied to a space between a pixel electrode 500 and a common electrode 460 of a unit pixel. An arrangement of the central-portion liquid crystal molecules 612, 614, and 615 is affected by both the pretilt angles of the alignment layer-adjacent liquid crystal molecules 611 and 613 and the pixel voltage, which is applied to the space between the pixel electrode 500 and the common electrode 460.

If a low-gradation level pixel voltage is applied to the space between the pixel electrode 500 and the common electrode 460 of the unit pixel 100, the central-portion liquid crystal molecules 612, 614, and 615 are substantially perpendicular to the surfaces of the first and second alignment layers 110 and 120 as illustrated in FIG. 1C. Since the transmission axes 111 and 121 of the liquid crystal display panel are perpendicular to each other, the amount of light passing through the unit pixel from the backlight assembly is limited in a VA mode device having a normally black mode. Therefore, if the pixel voltage has a voltage level corresponding to the minimum gradation level, the amount of light passing through the unit pixel is the minimum amount of light passing through the unit pixel.

On the other hand, if a high-gradation level pixel voltage is applied to the space between the pixel electrode 500 and the common electrode 460 of the unit pixel 100, polar angles of principal axes of the central-portion liquid crystal molecules 612, 614, and 615 (i.e., polar angles referring to angles between the principal axes of the liquid crystal molecules and the z-axis), vary from polar angles of the principal axes of the liquid crystal molecules 611 and 613 adjacent to the first and second alignment layers 110 and 120 up to polar angles of the principal axes of the centermost liquid crystal molecules 612 and 615 having the maximum polar angles. Azimuth angles of the principal axes of the central-portion liquid crystal molecules 612, 614, and 615 (i.e., azimuth angles referring to angles between projection lines of the principal axes of the central-portion liquid crystal molecules on the x-y plane and the x-axis), vary from an azimuth angle of the principal axis of the liquid crystal molecule 611 adjacent to the first alignment layer 110 up to an azimuth angle of the principal axis of the liquid crystal molecule adjacent to the second alignment layer 120, as illustrated in FIG. 1D.

Therefore, if the highest-gradation level pixel voltage is applied to the space between the pixel electrode 500 and the common electrode 460, the polar angles of the centermost liquid crystal molecules 612 and 615 approximates about 90°, whereas the azimuth angle thereof crosses the transmission axes 111 and 121 of the liquid crystal display panel at an angles of about 45°. If such characteristics of liquid crystal molecules are considered with respect to the VA mode device, light from the backlight assembly is subject to linear polarization by passing along the first transmission axis 111 of the first polarizer; thereafter, the light is subject to elliptical or circular polarization by passing through the central-portion liquid crystal molecules 612, 614, and 615; finally, the light is subject to linear polarization by passing along the second transmission axis 121 of the second polarizer, making it possible for a sufficient amount of light to pass through the unit pixel. Therefore, if the highest-gradation level pixel voltage is applied to the unit pixel, the amount of light passing through the unit pixel from the backlight assembly is the maximum amount of light passing through the unit pixel.

Unlike those of the central-portion liquid crystal molecules 612, 614, and 615, polar angles and azimuth angles of the alignment layer-adjacent liquid crystal molecules 611 and 613 are determined by the alignment vectors 310, 320, 330, and 340 of the first and second alignment layers 110 and 120, without being changed by various gradation-level voltages or electric fields applied to the space between the pixel electrode 500 and the common electrode 460 as described above. Therefore, if a high-gradation level voltage is applied to the space between the pixel electrode 500 and the common electrode 460 as described with reference to FIG. 1D, the alignment layer-adjacent liquid crystal molecules 611 and 613 do not change the polarization of the light passing through them to elliptical polarization or circular polarization, thereby contributing to a reduction in the amount of light passing through the unit pixel. Accordingly, in order to increase the amount of light passing through the unit pixel, the polar angles and azimuth angles are changed by adjusting the pretilts of the alignment layer-adjacent liquid crystal molecules 611 and 613.

SUMMARY OF THE INVENTION

To adjust polar angles and azimuth angles of liquid crystal molecules adjacent the alignment layers, angles between directions of slits formed in a pixel electrode and alignments of the liquid crystal molecules adjacent the alignment layers are relevant for increasing the amount of light passing through a unit pixel.

To obtain improved picture quality, a unit pixel may have a plurality of subpixel electrodes. At a predetermined gradation level, different voltages are applied to the subpixel electrodes, and liquid crystal molecules on the subpixel electrodes are arranged in different ways. To apply different voltages to the subpixel electrodes, the unit pixel may include a plurality of transistors or capacitors connected to the subpixel electrodes. If the light blocking members, such as a plurality of thin film transistors, a capacitor, and a charge coupler, are positioned in the unit pixel, the light passing area of the pixel electrode and the transmittance ratio of the unit pixel are undesirably reduced. Therefore, there is a need to remove the light blocking members or to reduce the area of the light blocking members.

Exemplary embodiments of the present invention provide a liquid crystal display panel in which the amount of light passing through a unit pixel is increased by adjusting a polar angle and an azimuth angle of principal axes of liquid crystal molecules adjacent to an alignment layer(s). The polar and azimuth angles are adjusted by changing the pretilts of the liquid crystal molecules adjacent the alignment layers.

Exemplary embodiments of the present invention provide a liquid crystal display panel with improved aperture ratio and transmittance of a unit pixel.

Exemplary embodiments of the present invention also provide a liquid crystal display panel with a pixel electrode of a unit pixel having an increased area and of the unit pixel having micro pixels.

In accordance with an embodiment of the present invention, there is provided a unit pixel for use in a liquid crystal display panel. The unit pixel includes a pixel electrode on a first substrate, a first alignment layer on the pixel electrode, a second substrate disposed opposite to and spaced apart from the first substrate, said second substrate having a second alignment layer thereon, a liquid crystal layer disposed between the first and second substrates, and a plurality of domains, each of the plurality of domains having different domain alignment vectors. The domain alignment vectors are produced by a plurality of alignment vectors defined by alignments of liquid crystal molecules adjacent to the first and second alignment layers. Each of the domains has a plurality of slits formed as openings in the pixel electrode. Further, in each domain of the plurality of domains, a slit angle is less than 45 degrees, and the slit angle is defined as the angle between an alignment vector of the liquid crystal molecules adjacent to the first alignment layer and the extension direction of the slits in said each domain.

The slit angle may be less than or equal to about 37.5°.

The slit angle may be greater than or equal to about 25.0°.

The slit angle may be greater than or equal to about 30.0°.

A width of the slit may be less than or equal to about 3.2 um.

A width of the slit may be less than or equal to about 3.0 um.

In accordance with another embodiment of the present invention, there is provided a unit pixel for use in a liquid crystal display panel. The unit pixel includes a plurality of pixel electrodes formed on a first substrate, a first alignment layer on the pixel electrodes, a second substrate disposed opposite to and spaced apart from the first substrate, said second substrate having a second alignment layer thereon, a liquid crystal layer disposed between the first and second substrates, and a plurality of domains, each of the domains having a different domain alignment vector. The domain alignment vectors are produced by a plurality of alignment vectors defined by alignments of liquid crystal molecules adjacent to the first and second alignment layers. At least one of the plurality of pixel electrodes has slits formed as openings in the pixel electrode, and another of the pixel electrodes is without the slits. The pixel electrode having the slits and the pixel electrode not having the slits each have the plurality of domains. In each of the plurality of domains on the at least one pixel electrode having the slits, the slit angle is less than 45 degrees, and the slit angle is defined as the angle between the alignment vector of the liquid crystal molecules adjacent the first alignment layer and an extension direction of the slits.

The slit angle may be less than or equal to about 37.5°.

A width of the slit may be less than or equal to about 3.2 um.

The unit pixel may further include a thin film transistor applying a pixel voltage to both the pixel electrode including the slits, and to the pixel electrode in which the slits are not formed.

The thin film transistor may be situated between the pixel electrode in which the slits are not formed and the pixel electrode in which the slits are formed.

In accordance with a further embodiment of the present invention, there is provided a unit pixel for use in a liquid crystal display panel. The unit pixel includes a pixel electrode formed on a first substrate, a first alignment layer on the pixel electrode, a second substrate disposed opposite to and spaced apart from the first substrate, the second substrate having a second alignment layer thereon, a liquid crystal layer disposed between the first and second substrates, and a plurality of domains, each of the plurality of domains having a different domain alignment vector. The domain alignment vectors are produced by alignments of liquid crystal molecules adjacent to the first and second alignment layers. Each of the domains includes a plurality of slits formed as openings in the pixel electrode, and a plurality of slit branches are formed alternately between the slits and connected with the pixel electrode. The slits and the slit branches in each of domains adjacent to one another are arranged in at least one boundary region between the adjacent domains, the slit branches being connected to a slit stem in the at least one boundary region.

The at least one boundary region may include a domain boundary texture, and a width of the slit stem may be less than a width of the domain boundary texture.

The width of the slit stem may be less than or equal to about 10 um.

The width of the slit stem may be equal to a width of the a branch.

The width of the slit stem may range between a width of a slit branch and a width of the domain boundary texture.

In each of the plurality of domains, a slit angle defined as an angle between the alignment vector of liquid crystal molecules adjacent to the first alignment layer and an extension direction of the slits. The slit angle may be less than 45°.

In accordance with yet another embodiment of the present invention, there is provided a unit pixel for use in a liquid crystal display panel. The unit pixel includes a first substrate having a pixel electrode and a first alignment layer formed on the pixel electrode. The first alignment layer is made by photo-irradiation. The unit pixel further includes a second substrate spaced apart from the first substrate facing the first substrate and having a second alignment layer formed on the second substrate and made by photo-irradiation; a liquid crystal layer interposed between the first and second substrates; and a plurality of domains each having a different one of a plurality of alignment vectors formed by alignments of liquid crystal molecules adjacent to the first and second alignment layers. A plurality of slits are formed in the pixel electrode. The pixel electrode may have a slit region in which the slits are formed in a concentrated configuration, and a non-slit region in which the slits are not formed.

A same pixel voltage may be applied to the slit region and the non-slit region.

The pixel electrode may have first and second micro pixel electrodes arranged to be spaced from each other, the slit region may be formed on the first micro pixel electrode, and the non-slit region may be formed on the second micro pixel electrode.

The unit pixel may have a texture region between adjacent domains or on an edge of a domain, and the slit region may overlap the texture region.

A width of the texture region may be narrower than a width of the slit region.

In accordance with an embodiment of the present invention, a unit pixel for a liquid crystal display panel comprises a substrate, a pixel electrode on the substrate, an alignment layer on the pixel electrode, and a plurality of domains on the pixel electrode, wherein each of the domains of the plurality of domains includes a plurality of slits formed in the pixel electrode, and a plurality of slit electrodes formed alternately between the slits, and wherein in each domain, a slit angle is less than 45 degrees, said slit angle being defined as an angle between an alignment vector of liquid crystal molecules adjacent to the first alignment layer and an extension direction of the slits in each domain.

A slit pitch in each domain may be less than or equal to about 6 μm, and may be defined as a sum of a slit width and a slit electrode width.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Figure 1A:
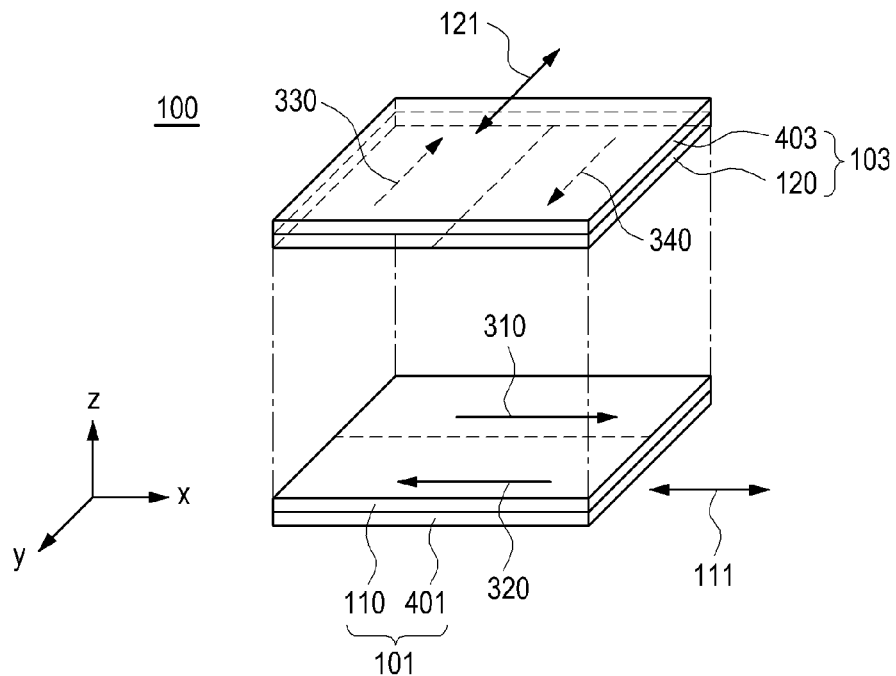
FIGS. 1A to 1D are enlarged conceptual diagrams illustrating alignment vectors of alignment layers of a conventional unit pixel and an arrangement of liquid crystal molecules.
Figure 1B:
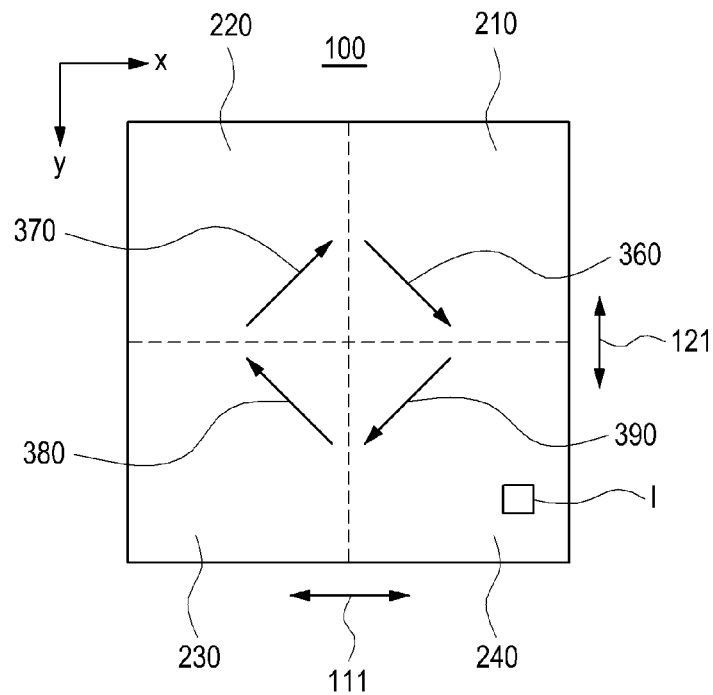
Figure 1C:
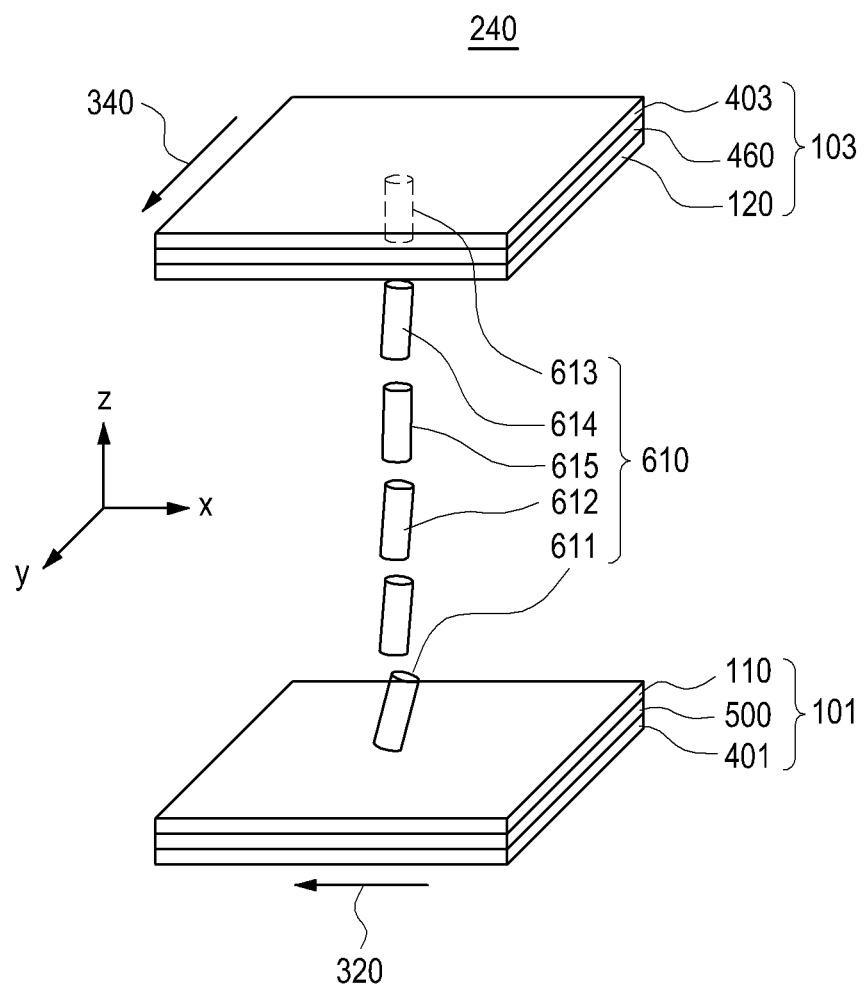
Figure 1D:
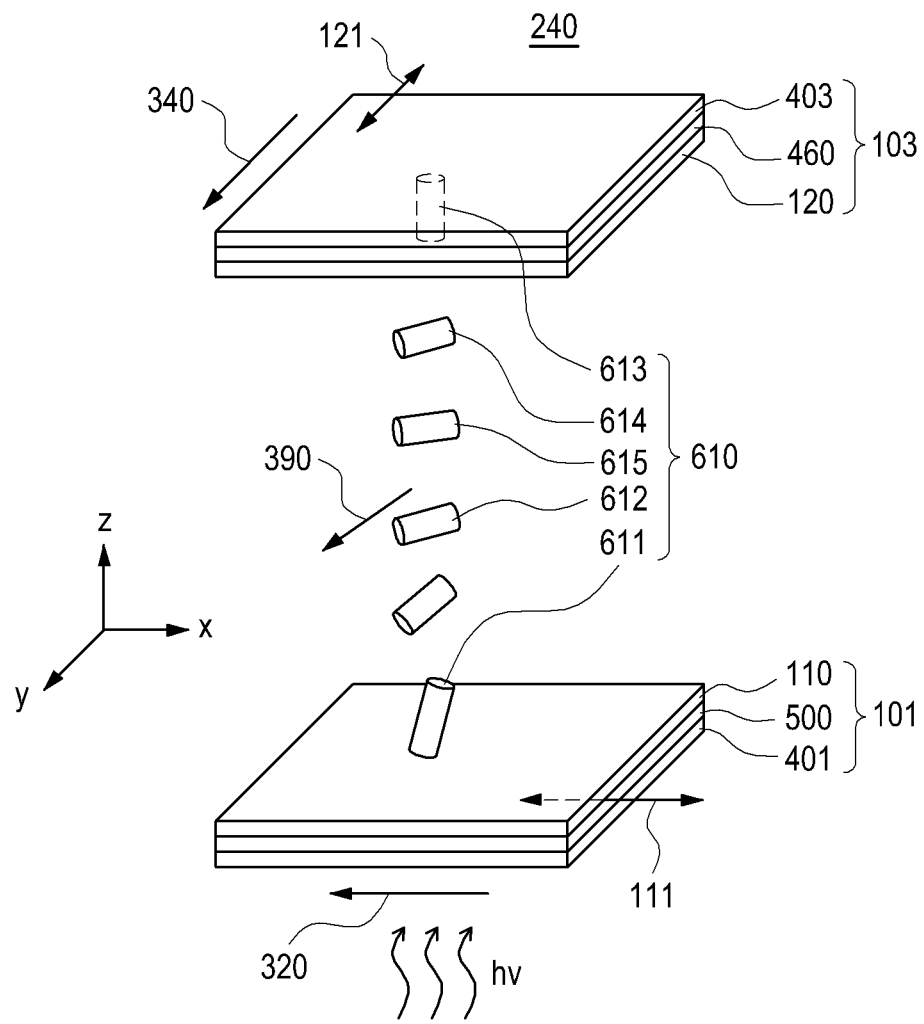

Exemplary embodiments of the present invention will now be described in further detail with reference to the accompanying drawings. In the following description, specific details such as detailed configuration and components are provided to assist with the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions may be omitted for clarity and conciseness.

Throughout the drawings, the same drawing reference numerals may refer to the same or similar elements, features and structures.

With reference to the accompanying drawings, descriptions will be made of unit pixels, to which a photoalignment process technology is applied and which have a plurality of domains according to embodiments of the present invention, and of liquid crystal display panels having the same. While many figures will be presented in the following description of embodiments of the present invention, the figures are not intended to limit the scope of the present invention.

For purposes of illustration, a liquid crystal display panel described in this specification is in a normally black mode and has a Vertical Alignment (VA) mode, in which, when an operating voltage is not applied to the space between two electrodes of a unit pixel, liquid crystal molecules in a liquid crystal layer are substantially perpendicular to substrates and transmission axes of polarizers are set to be perpendicular to each other, thereby preventing light from passing through the unit pixel. However, it is to be understood that the embodiments of the present invention are not necessarily limited to an LCD panel in a normally black mode and having a VA mode. Also, it is to be noted that in this disclosure, an angle or an alignment at which liquid crystal molecules are tilted with respect to a vertical direction of an alignment layer corresponds to an angle or an alignment at which liquid crystal molecules are tilted with respect to a principal axis or major axis of the liquid crystal molecules.

Figure 2:
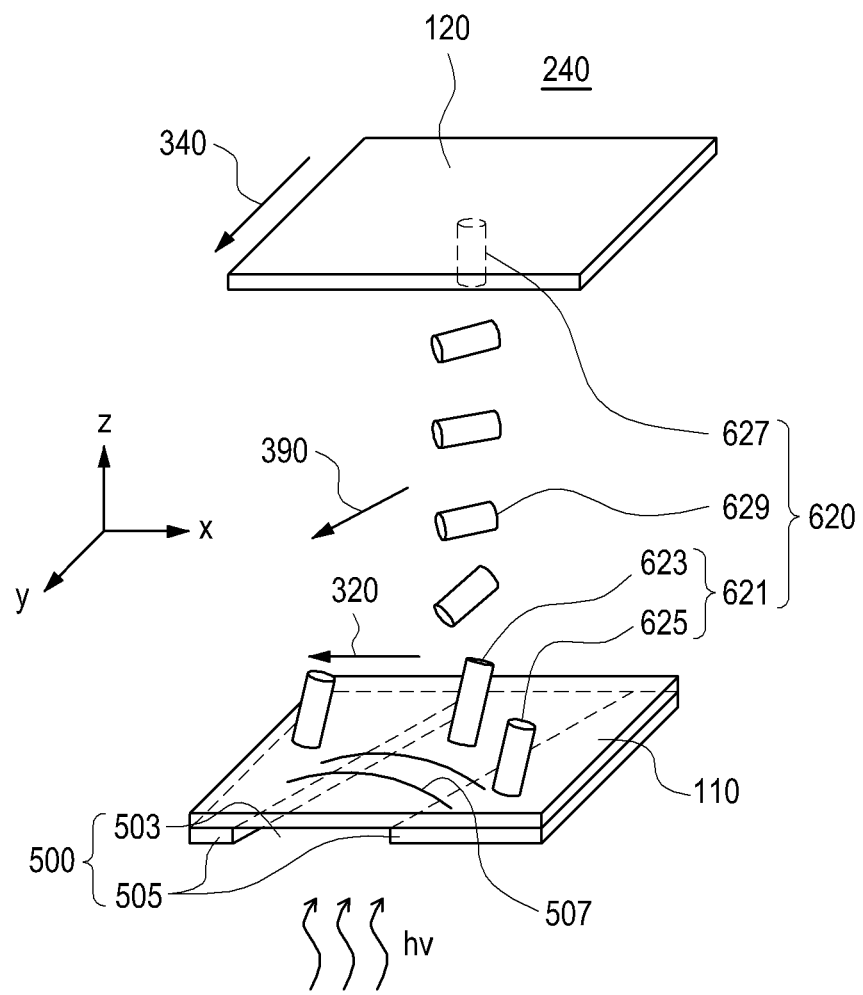
FIG. 2 is a partial perspective view and conceptual diagram of a unit pixel, according to an embodiment of the present invention.

FIG. 2 is a conceptual diagram illustrating an arrangement of liquid crystal molecules of a unit pixel having a pixel electrode in which slits are formed, according to an embodiment of the present invention. The arrangement occurs when a high-gradation level voltage (hv) is applied to the space between a pixel electrode and a common electrode in one of a plurality of domains in the unit pixel according to an embodiment of the present invention. In accordance with an embodiment of the present invention, a unit pixel has slits 503, which can be made by removing a portion of a pixel electrode 500 disposed under a first alignment layer 110.

The first alignment layer 110 is formed by, for example, photoalignment process technology disclosed in United States Patent Application Publication No. 2010-0157223 published on Jun. 24, 2010, and United States Patent Application Publication No. 2010-0034989 published on Feb. 11, 2010, both of which are incorporated by reference herein as a part of this specification, and are commonly assigned to the owner of this application. Alignments of liquid crystal molecules 625 adjacent to the first alignment layer 110 are represented by a second alignment vector 320 indicating a direction in which the liquid crystal molecules 625 are aligned. The alignment vector 320 is in the negative direction of the x-axis on planes that are parallel to the x-z plane, which is perpendicular to the first alignment layer 110. While slit electrodes or slit branches 505 are illustrated as being separated from each other, the slit electrodes/branches 505 are a portion of a whole pixel electrode connected in its entirety. A fringe field 507, a strength of which is proportional to a level of a pixel voltage applied to the pixel electrode, is formed between adjacent slit electrodes/branches 505.

First alignment layer-adjacent liquid crystal molecules 621 are divided into liquid crystal molecules 623 overlapping a slit 503 and liquid crystal molecules 625 overlapping the slit electrodes 505. An alignment of the liquid crystal molecules 625 overlapping the slit electrodes 505 is not changed when a voltage or electric field is applied to the unit pixel. On the other hand, as to the liquid crystal molecules 623 overlapping the slit 503, when a voltage or electric field applied to the pixel electrode 500 of the unit pixel increases, the azimuth angles of the principal axes of the liquid crystal molecules 623 are changed from a direction of the second alignment vector 320 to a direction of a fourth domain alignment vector 390. In addition, the polar angles of the principal axes of the liquid crystal molecules 623 are changed to a direction that is parallel to the first alignment layer 110.

That is, when the negative direction of the x-axis is a reference azimuth angle, the on-slit liquid crystal molecules 623 have an azimuth angle that is changed in a range between 0° and 45° with respect to the reference azimuth angle in proportion to a level of a voltage applied to the slit electrodes 505. An azimuth angle of central-portion liquid crystal molecules 629 is also changed to be substantially parallel to the fourth domain alignment vector 390 when an electric field between the pixel electrode and the common electrode increases, thereby making it possible for the amount of light passing through the unit pixel to increase when the azimuth angle of the on-slit liquid crystal molecules 623 is varied. Therefore, in accordance with the embodiments of the present invention, an alignment of principal axes of liquid crystal molecules overlapping the slits 503 is changed according to the level of a pixel voltage applied to the pixel electrode 500, making it possible to increase the amount of light passing through the unit pixel.

Figure 3A:
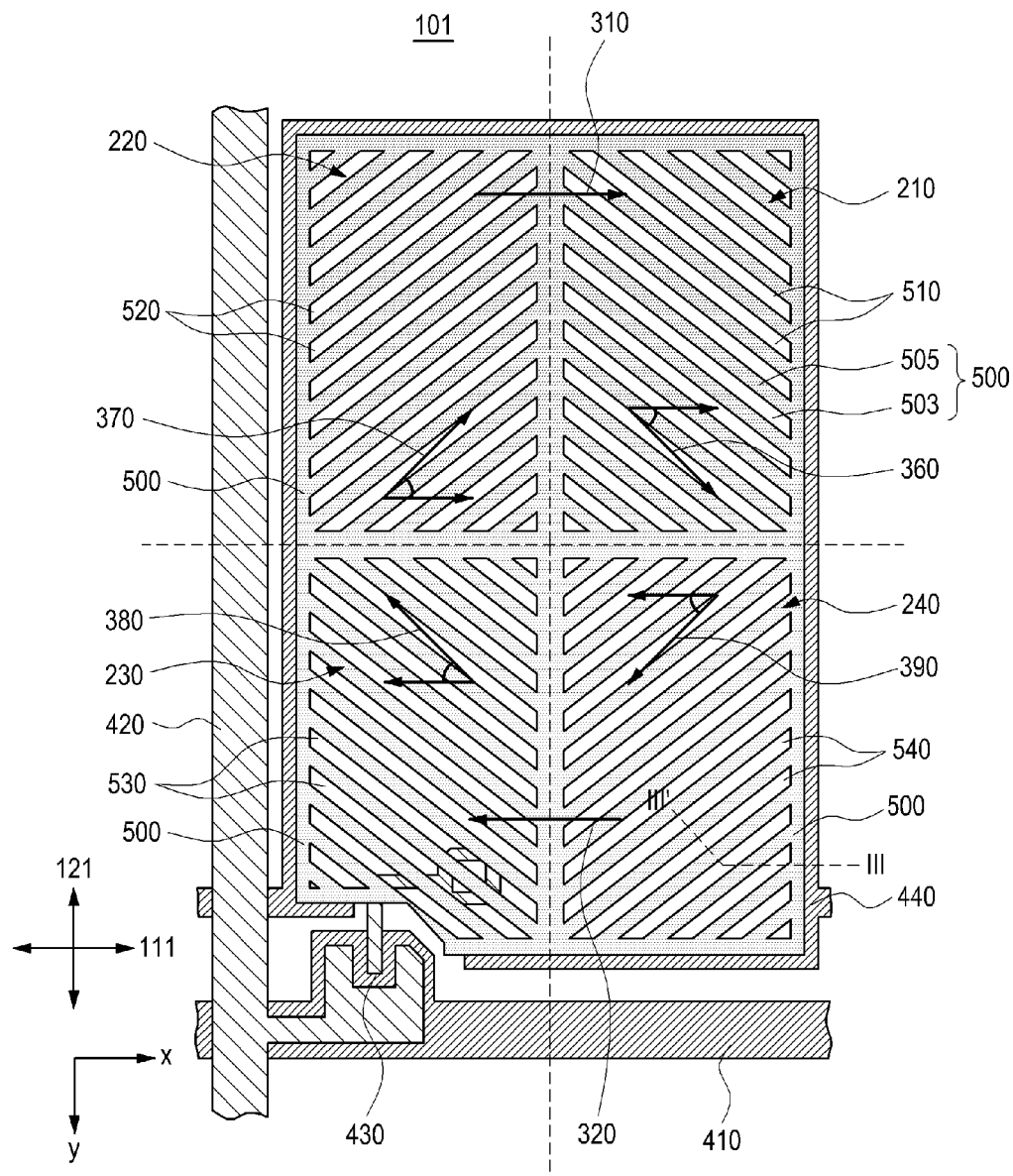
FIGS. 3A and 3B are plan views illustrating substrates of a unit pixel according to an embodiment of the present invention.
Figure 3B:
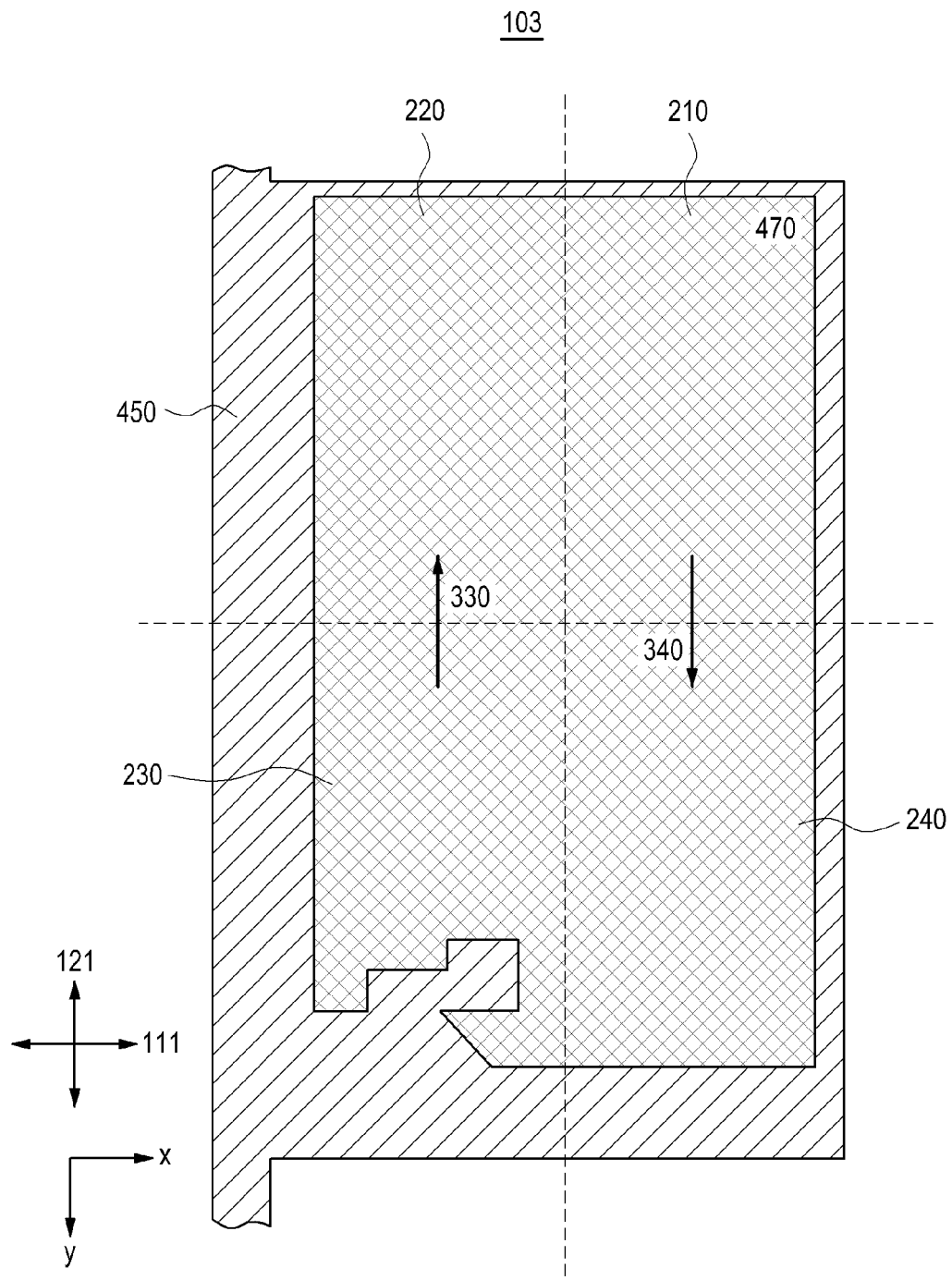
Figure 3C:
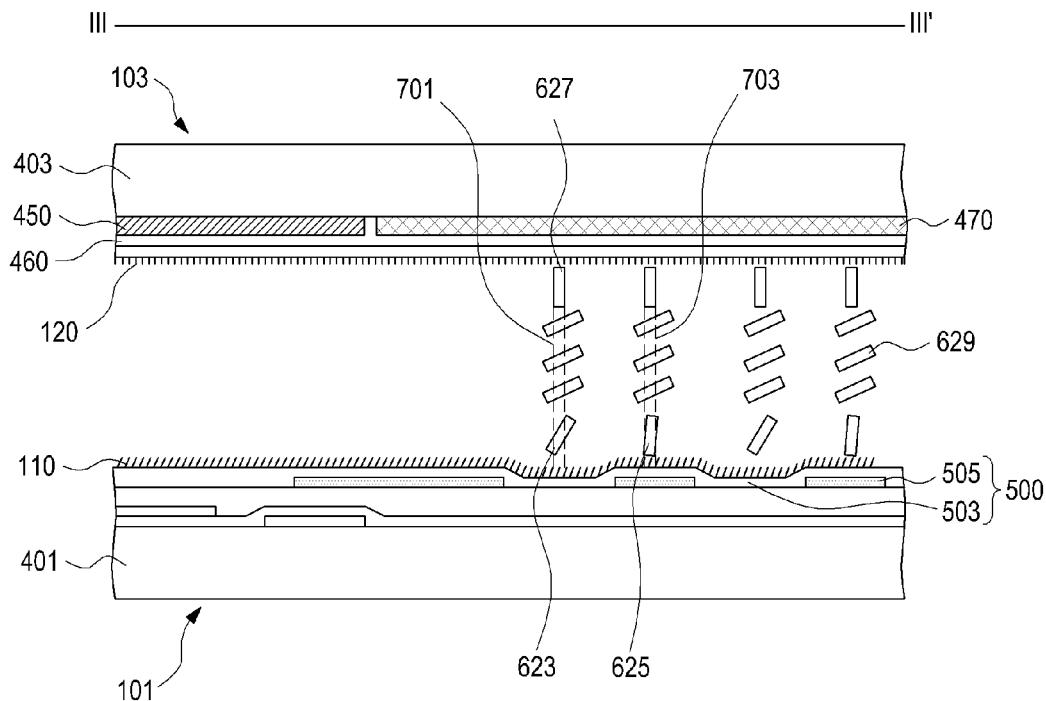
FIG. 3C is a cross-sectional view taken along line of the unit pixel shown in FIG. 3A.

FIG. 3A is a plan view of a first substrate of a unit pixel, having a pixel electrode with a plurality of slits and an alignment layer on which pretilts of liquid crystal molecules are formed. FIG. 3B is a plan view of a second substrate of the unit pixel, facing the first substrate of FIG. 3A. FIG. 3C is a cross-sectional view of the unit pixel taken along line of FIG. 3A, and showing the first substrate in FIG. 3A and the second substrate in FIG. 3B assembled facing each other.

Referring to FIGS. 3A to 3C, the first substrate 101 of the unit pixel has a pixel electrode 500 with slits 503. The slits 503 are formed by, for example, removing a portion of the pixel electrode disposed in the first substrate 101. The second substrate 103 has a common electrode 460 disposed on the surface of the second substrate 103. The common electrode 460 does not include slits. In accordance with an embodiment of the present invention, in a given domain, an angle between a direction of an alignment of liquid crystal molecules on an alignment layer, which is on the pixel electrode 500 having a slit 503, and an extension direction of the slit 503 is less than an angle at which the alignment direction of the alignment layer within the domain crosses a domain alignment vector. In other words, in a given domain, an angle at which an extension direction of a slit in the pixel electrode 500 crosses an alignment direction of the alignment layer, is less than 45°. The alignment direction of the alignment layer is the same as the direction of the principal axes of liquid crystal molecules on the alignment layer.

Referring to FIGS. 3A and 3C, the first substrate 101 includes a first underlying substrate 401, a gate line 410, a data line 420, a thin film transistor 430, the pixel electrode 500, a storage electrode 440, and a first alignment layer 110. The thin film transistor 430 supplies a pixel voltage to the pixel electrode 500 by signals of the gate line 410 and the data line 420. The first alignment layer 110 is disposed on the pixel electrode 500, makes contact with liquid crystal molecules, and has first and second alignment vectors 310 and 320, which can be made by, for example, the above-described photoalignment process technology and are parallel to the x-axis.

Referring to FIGS. 3B and 3C, the second substrate 103 has a second underlying substrate 403, a black matrix 450, a color filter 470, a common electrode 460, and a second alignment layer 120. The color filter 470 represents a filter of one color among the primary colors of the unit pixel, such as red, green or blue. The common electrode is formed over the entire top surface of the second substrate 103, and a constant reference voltage is supplied to common electrodes of all unit pixels on the liquid crystal display panel. Therefore, an arrangement of liquid crystal molecules of a unit pixel is adjusted by a voltage or electric field between the pixel electrode 500 and the common electrode 460. The second alignment layer 120 is disposed on the common electrode 460, makes contact with liquid crystal molecules, and has third and fourth alignment vectors 330 and 340, which are made by a photoalignment process (e.g., the above-described photoalignment process) and are parallel to the y-axis.

The pixel electrode 500, according to an embodiment of the present invention, has first to fourth slits 510, 520, 530, and 540, which extend in different directions in domains 210, 220, 230, and 240, respectively. An angle (hereinafter referred to as a 'slit angle') between each of the alignment vectors 310 and 320 of the alignment layer 110 on the first substrate 101, in which slits 510, 520, 530, and 540 in the domains 210, 220, 230, and 240 are formed, and each of extension directions of the slits 510, 520, 530, and 540 is less than an angle between each of the alignment vectors 310 and 320 and each of domain alignment vectors 360, 370, 380, and 390 in the domains 210, 220, 230, and 240. It can be understood by those of ordinary skill in the art that as illustrated, the slits 510, 520, 530, and 540 may be made by removing some portions of the pixel electrode 500, using a mask having a predetermined pattern, and each slit 503 may be positioned between the slit electrodes 505. The same pixel voltage is supplied to each of the slit electrodes 505 in a unit pixel. Also, it can be understood by those of ordinary skill in the art that, although not illustrated, the common electrode 460 on the second substrate 103 may have slits formed by removing some portions thereof. Like the slits 503 in the pixel electrode 500, the slits in the common electrode 460 act such that liquid crystal molecules thereon are changed in arrangement according to the voltage applied to the space between the common electrode 460 and the pixel electrode 500, thereby contributing to improvement in light transmittance of the unit pixel. However, if a material of the common electrode is excessively removed from the common electrode, it may be difficult to apply a constant reference voltage to the common electrode, so the area of slits is limited. The area of slits formed in the common electrode may be less than the area of slits formed in the pixel electrode, so that, when slits are formed on the common electrode, a slit density of the common electrode is less than a slit density of the pixel electrode.

According to an embodiment of the present invention, to improve transmittance of the liquid crystal display panel, liquid crystal molecules cross the transmission axes of the liquid crystal display panel at an appropriate angle. For example, in the case where the highest-gradation level voltage is applied to a unit pixel, as liquid crystal molecules change their azimuth angles so as to cross the transmission axes at an angle of 45°, the light having been linearly polarized passing along the first transmission axis 111 is subject to circular polarization passing through the liquid crystal molecules. Among the liquid crystal molecules, liquid crystal molecules 629 in the central portion of the liquid crystal layer change their azimuth angles according to the gradation level voltage applied to the space between the pixel electrode 500 and the common electrode 460. On the other hand, the liquid crystal molecules 625 and 627 located adjacent to the alignment layers 110 and 120 on the pixel electrode 500 and the common electrode 460 have a constant azimuth angle determined by the pretilts of the alignment layers 110 and 120 regardless of the gradation level voltage applied to the space between the pixel electrode 500 and the common electrode 460.

However, as illustrated in FIGS. 2 and 3C, for the liquid crystal molecules 623 on the first alignment layer 110, which overlap the slits 503, change in azimuth angle and polar angle occurs according to the voltage applied to the slit electrodes 505 around the slits 503. Therefore, according to an embodiment of the present invention, azimuth angles and/or polar angles of the liquid crystal molecules 623 overlapping the slits 503 are changed to improve transmittance of the unit pixel.

The liquid crystal molecules 627, which are disposed in a through-slit optical path 701 (i.e., an optical path along which light passes the liquid crystal molecules overlapping the slits 503), and which are adjacent to the second alignment layer 120 on the common electrode 460, have a constant azimuth angle and polar angle determined by a pretilt of the second alignment layer 120 regardless of the gradation level voltage applied to the space between the pixel electrode 500 and the common electrode 460. Whereas, the azimuth and the polar angles of the liquid crystal molecules 623 which overlap the slits 503 and are adjacent to the first alignment layer 110, change according to the gradation level voltage.

Also, after passing through the liquid crystal molecules 627 adjacent to the second alignment layer 120, the light passing along the through-slit optical path 701 may pass a polarizer (not shown) on the second substrate 103 in a polarization state other than a predetermined polarization. For example, if the highest-gradation level pixel voltage is applied to the pixel electrode 500 of the unit pixel, the light having passed a polarizer (not shown) on the first substrate 101 in linear polarization may pass the polarizer on the second substrate 103 not in linear polarization, but in, for example, elliptical polarization. In addition, in accordance with an embodiment of the present invention, given that an electrode branch optical path 703 (i.e., a path of light passing through the slit electrodes 505 of the pixel electrode 500), exists in the unit pixel and light in the electrode branch optical path 703 passes the polarizer on the second substrate 103 in linear polarization, a critical range of slit angles and a direction of the slits which affect azimuth and/or polar angles of the liquid crystal molecules 623 is determined.

Figure 4A:
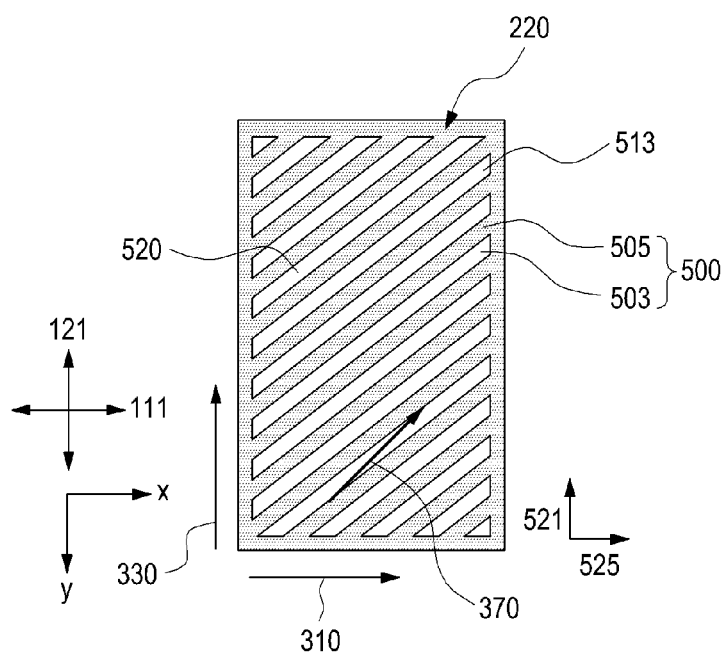
FIG. 4A is a plan view illustrating a second domain, and alignment vectors and their azimuth angle and polar angle.
Figure 4B:
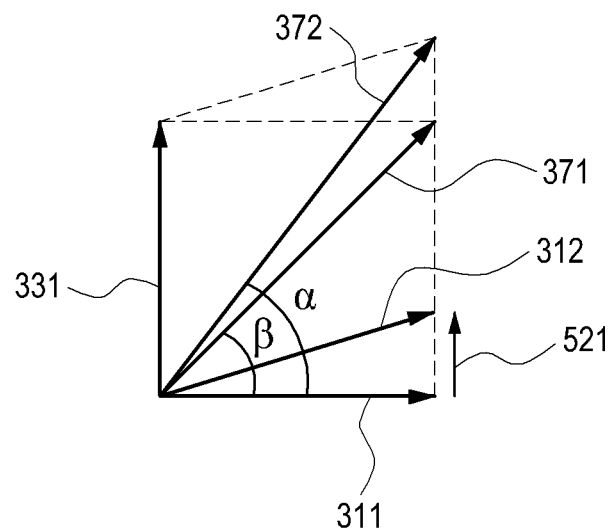
FIGS. 4B and 4C are vector diagrams illustrating azimuth angle vectors and polar angle vectors in FIG. 4A, respectively.
Figure 4C:
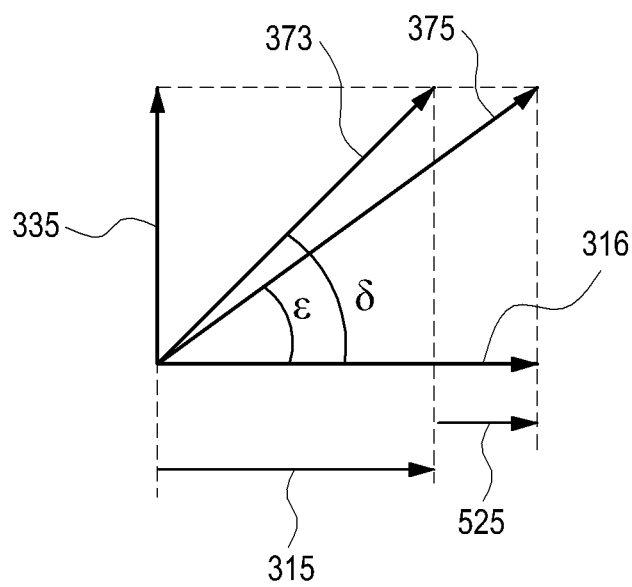

FIG. 4A is a plan view illustrating alignment vectors related to extension directions of slits and their azimuth and polar angles, in a second domain, according to an embodiment of the present invention. FIGS. 4B and 4C are vector diagrams illustrating azimuth angle vectors and polar angle vectors, respectively.

As illustrated in FIG. 4A, alignment layers having a first alignment vector 310, a third alignment vector 330 being perpendicular to and having the same magnitude as the first alignment vector 310, a second domain alignment vector 370 representing the sum of the first and third alignment vectors 310 and 330, a polarizer having a polarization axis 111 being parallel to the first alignment vector 310, and a polarizer having a polarization axis 121 being parallel to the third alignment vector 330, have been described above. Since the first alignment vector 310, determined by an alignment of the liquid crystal molecules on the first alignment layer 110, and the third alignment vector 330, determined by an alignment of the liquid crystal molecules on the second alignment layer 120, are perpendicular to each other and their absolute values are equal to each other, an angle between the first alignment vector 310 and the second domain alignment vector 370 is 45°.

A slit azimuth angle vector 521 is an azimuth angle vector that is generated due to a change in azimuth angle of principal axes of liquid crystal molecules overlapping second slits 520 when a pixel voltage is applied to the pixel electrode; and a slit polar angle vector 525 is a polar angle vector that is generated due to a change in polar angle of principal axes of liquid crystal molecules overlapping the second slits 520 when a pixel voltage is applied to the pixel electrode. According to embodiments of the present invention, the slit azimuth angle vector 521 and the slit polar angle vector 525 are determined taking into consideration average changes in principal axes of the liquid crystal molecules overlapping the slits and the slit electrodes.

Referring to FIGS. 4B and 4C, a first azimuth angle alignment vector 311 and a first polar angle alignment vector 315 are vector components of an azimuth angle and a polar angle of the first alignment vector 310; a third azimuth angle alignment vector 331 and a third polar angle alignment vector 335 are vector components of an azimuth angle and a polar angle of the third alignment vector 330. Then, because the first and third azimuth angle alignment vectors 311 and 331 are perpendicular to each other and have the same absolute values, a vector sum of the two alignment vectors 311 and 331 is a second domain azimuth angle alignment vector 371. An angle β between the second domain azimuth angle alignment vector 371 and the first azimuth angle alignment vector 311 is 45°. Therefore, if there are no slits in the pixel electrode, the second domain azimuth angle alignment vector 371 becomes an azimuth angle vector component of the second domain alignment vector 370.

On the contrary, in the case where slits are in the pixel electrode, if a pixel voltage is applied to the pixel electrode, a first transformed azimuth angle alignment vector 312 is generated by summing the first azimuth angle alignment vector 311 and the slit azimuth angle vector 521. According to an embodiment, since in the common electrode disposed under the second alignment layer 120, there are no slits and no separate vector to be summed up with the third azimuth angle alignment vector 331, a second transformed domain azimuth angle alignment vector 372 is generated by summing the first changed azimuth angle alignment vector 312 and the third azimuth angle alignment vector 331, whereby the changed azimuth angle α between the second changed domain azimuth angle alignment vector 372 and the first azimuth angle alignment vector 311 is greater than the angle β. That is, an average of azimuth angles of principal axes of the liquid crystal molecules on the pixel electrode including the slits in the second domain is greater than 45°.

However, when an average of azimuth angles of principal axes of liquid crystal molecules in one domain is 45° as described above, because the light incident from a backlight assembly (not shown) undergoes linear polarization along the first transmission axis 111, thereafter undergoes circular polarization by liquid crystal molecules in the domain, and then undergoes linear polarization along the second transmission axis 121, the second domain azimuth angle α is required to be reduced to approximate 45° in order to make the elliptical polarization be close to the circular polarization. The elliptical polarization is caused by the changed azimuth angle of liquid crystal molecules overlapping the second slits due to the application of the pixel voltage.

Referring to FIG. 4C depicting polar angle vectors, as described in connection with the first azimuth angle alignment vector 311 and the third azimuth angle alignment vector 331, the first polar angle alignment vector 315 and the third polar angle alignment vector 335 are polar angle vector components of the first and third alignment vectors 310 and 330, respectively. Because the first and third polar angle alignment vectors 315 and 335 are perpendicular to each other and have the same absolute values, a sum of these two vectors is a second domain polar angle alignment vector 373 and an angle δ between the second domain polar angle alignment vector 373 and the first polar angle alignment vector 315 is 45°.

When a pixel voltage is applied to the pixel electrode, because polar angles of principal axes of the liquid crystal molecules overlapping the second slits 520 increase, there is a slit polar angle vector 525 having the same direction as the first polar angle alignment vector 315, causing a first transformed polar angle alignment vector 316, which is a sum of the first polar angle alignment vector 315 and the slit polar angle vector 525. According to an embodiment, because there are no slits on the common electrode disposed under the second alignment layer 120 as described above, the sum of the first changed polar angle alignment vector 316 and the third polar angle alignment vector 335 is a second transformed polar angle vector 375, and the changed polar angle ε between the second transformed polar angle vector 375 and the first transformed polar angle alignment vector 316 is less than the angle δ, or less than 45°. As described above, since it is desired for the light passing through liquid crystal molecules overlapping the slits in the second domain to undergo circular polarization, the changed polar angle ε is required to approach the angle δ.

As a result, to improve transmittance of the second domain, the changed azimuth angle α and the changed polar angle ε are required to approximate 45° by adjusting magnitudes of the slit azimuth angle vector 521 and the slit polar angle vector 525. To do so, in accordance with an embodiment of the present invention, a critical range of slit angles, or an angle between the first alignment vector 310 and extension directions of the second slits 520 in the second domain is determined.

Figure 5A:
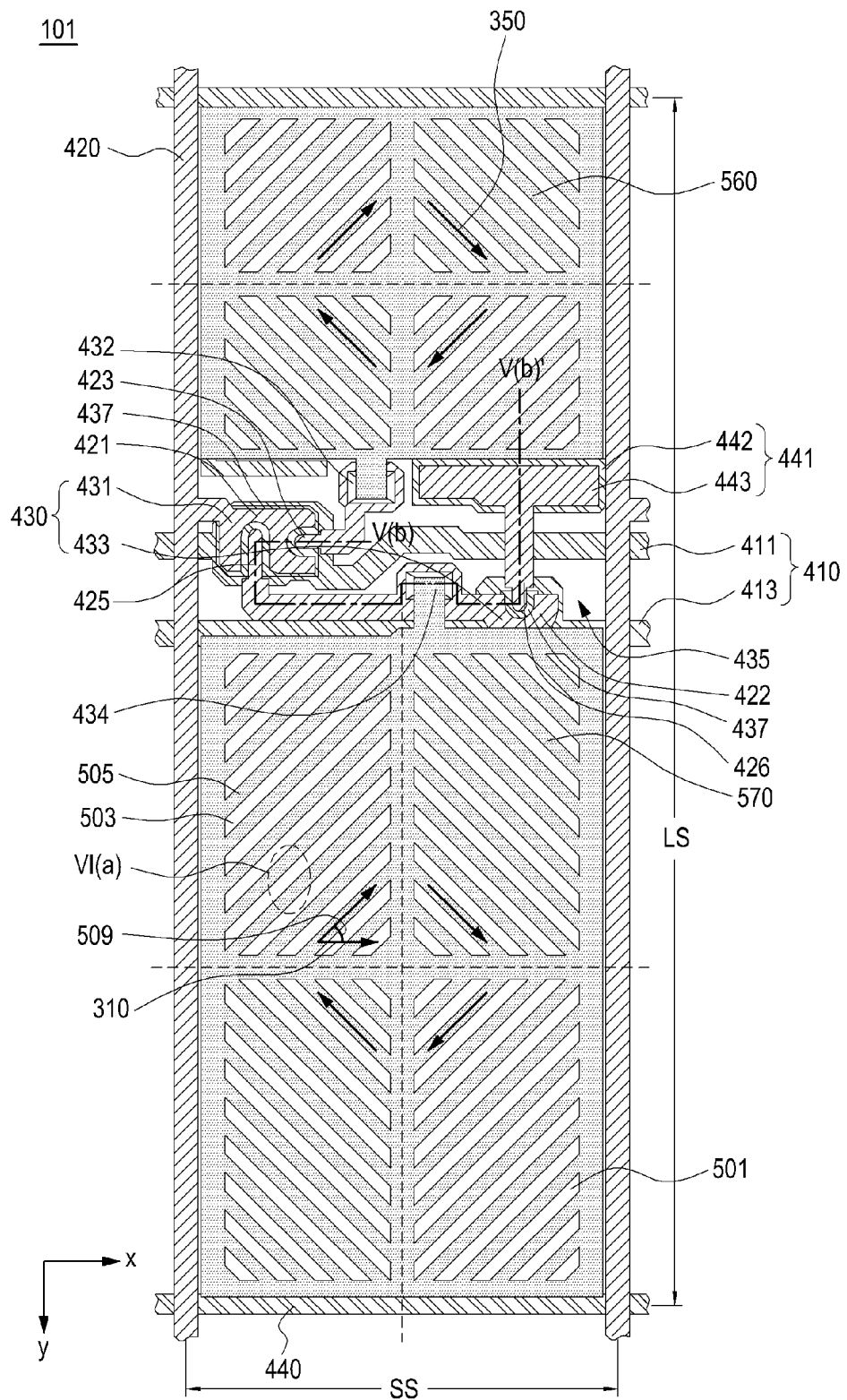
FIG. 5A is a plan view of a first substrate of a unit pixel according to an embodiment of the present invention, used for finding critical slit angles.
Figure 5B:
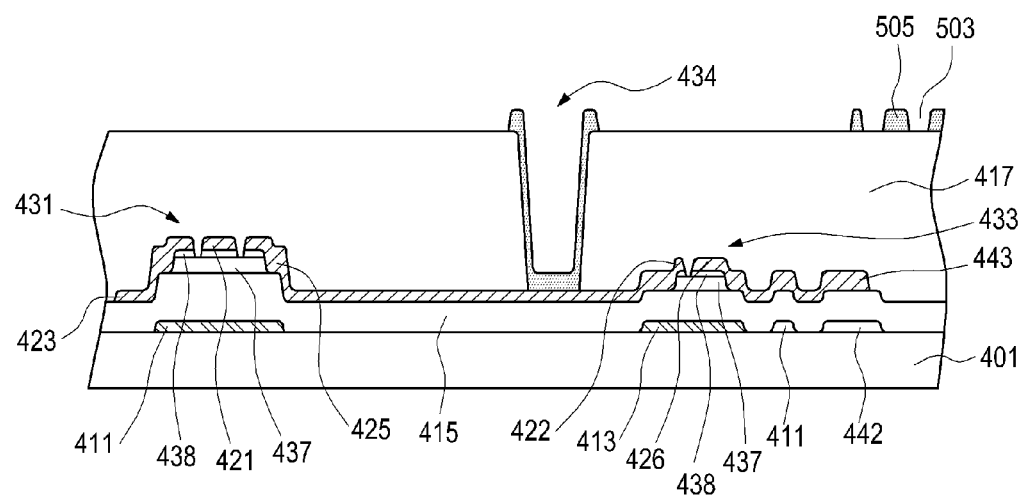
FIG. 5B is a plan view taken along line V(b)~V(b)' on the first substrate of the unit pixel shown in FIG. 5A.

FIG. 5A is a plan view of a first substrate 101 of a unit pixel, used for finding the critical slit angles, according to an embodiment of the present invention, and FIG. 5B is a cross-sectional view taken along line V(b)~V(b)' in FIG. 5A. Unlike that illustrated in FIG. 3A, a pixel electrode on a first substrate in a unit pixel in FIG. 5A includes a plurality of micro pixel electrodes, or first and second pixel electrodes 560 and 570, which are spaced apart from each other. Onto each of the micro pixel electrodes is applied a first alignment layer (not shown) on which a pretilt is formed by the above-referenced photoalignment process. Each micro pixel electrode has a plurality of domains, and each domain has slits 503 extending in a direction different from that in adjacent domains in the column and row directions. The liquid crystal display (LCD) panels used for finding the critical slit angles have the conditions listed in Table 1 below.

TABLE 1

| | |
|---|---|
| Diagonal length of LCD panel | 40 inches |
| Resolution of LCD panel | Full HD (1920 × 2080) |
| Liquid crystal | ZSM-7125 |
| | (Product of Chisso Corporation) |
| Vertical length LS of unit pixel | 461.25 μm |
| Horizontal length SS of unit pixel | 153.75 μm |
| Area of first pixel electrode 560 | 133.75 × 137.75 μm² |
| Area of second pixel electrode 570 | 133.75 × 205.00 μm² |
| Area of voltage applying region 435 | 133.75 × 77.5 μm² |
| Width of gate lines 411 and 413 | 10.0 μm |
| Width of data line 420 | 10.0 μm |
| Area of down capacitor 441 | 62.0 × 11.0 μm² |
| Width of slit 503 | 3.5 μm |
| Width of slit electrode 505 | 3.5 μm |
| Voltage on data line 420 | 16.8 volts |
| | (for highest gradation level) |
| Voltage on common electrode | 8.6 volts |

Although not illustrated, like that illustrated in FIG. 3B, a second substrate 103 faces a first substrate 101 in FIG. 5A, with a liquid crystal layer interposed therebetween. According to an embodiment, the second substrate may include a single common electrode, a black matrix that is formed on the common electrode and faces a data line 420 and a voltage applying region 435 on the first substrate 101, a color filter surrounded by the black matrix, and a second alignment layer which is disposed on these components and in which a pretilt is formed by the above-referenced photoalignment process. As described above, in accordance with an embodiment, no slits are formed in the common electrode.

Referring to FIGS. 5A and 5B, on a first underlying substrate 401 are formed first and second gate lines 411 and 413 comprising, for example, an Al, Cu, Mo or Ni conductive layer. The first underlying substrate 401 also includes a first capacitor electrode 442, and a gate insulating layer 415 comprising a material such as nitric oxide (NOx) formed on the first capacitor electrode 442 and the first and second gate lines 411 and 413. In regions of first and second thin film transistors 431 and 433, which are formed on the gate insulating layer 415, are formed in sequence a semiconductor layer 437, formed of, for example, amorphous silicon, and an ohmic contact layer 438 made by, for example, doping impurities to the amorphous silicon. On the ohmic contact layers 438 of the first and second thin film transistors 431 and 433 are formed first and second source electrodes 421 and 422, first to third drain electrodes 423, 425 and 426, and a second capacitor electrode 443, each of which comprises, for example, Al, Cu, Mo, or Ni. A protection layer 417 comprising, for example, a carbon compound is formed on the structure including the source, drain and capacitor electrodes. On the protection layer 417 is formed the pixel electrode including the slits 503 and slit branches/electrodes 505.

The first source electrode 421 of the first thin film transistor 431 is connected to the data line 420, and the drain electrodes 423 and 425 are connected to the first and second pixel electrodes 560 and 570 through first and second contact portions 432 and 434. The second source electrode 422 of the second thin film transistor 433 is connected to the second drain electrode 425. The second capacitor electrode 443 is connected to the drain electrode 426 of the second thin film transistor 433 and overlaps the first capacitor electrode 442, which is projected from a storage electrode under a peripheral portion of the first pixel electrode 560. The gate insulating layer 415 is interposed between the first capacitor electrode 442 and the second capacitor electrode 443, thereby forming a down capacitor 441.

If the first thin film transistor 431 is turned on, a voltage on the data line 420 is applied to the first and second pixel electrodes 560 and 570, and if the second thin film transistor 433 is turned on, a voltage on the second pixel electrode 570 is reduced by an amount of a voltage charged by the down capacitor 441. In an embodiment of the present invention, a level of the voltage applied to the second pixel electrode 570 is about 80% of a level of the voltage applied to the first pixel electrode 560.

As can be understood from FIG. 5A, since a vertical length (the vertical direction in FIG. 5A) of the first pixel electrode 560 is approximately ½ a vertical length of the second pixel electrode 570, and is approximately two times a vertical length of the voltage applying region 435, a ratio of areas of the second pixel electrode 570, the first pixel electrode 560, and the voltage applying region 435 is 4:2:1.

Figure 5C:
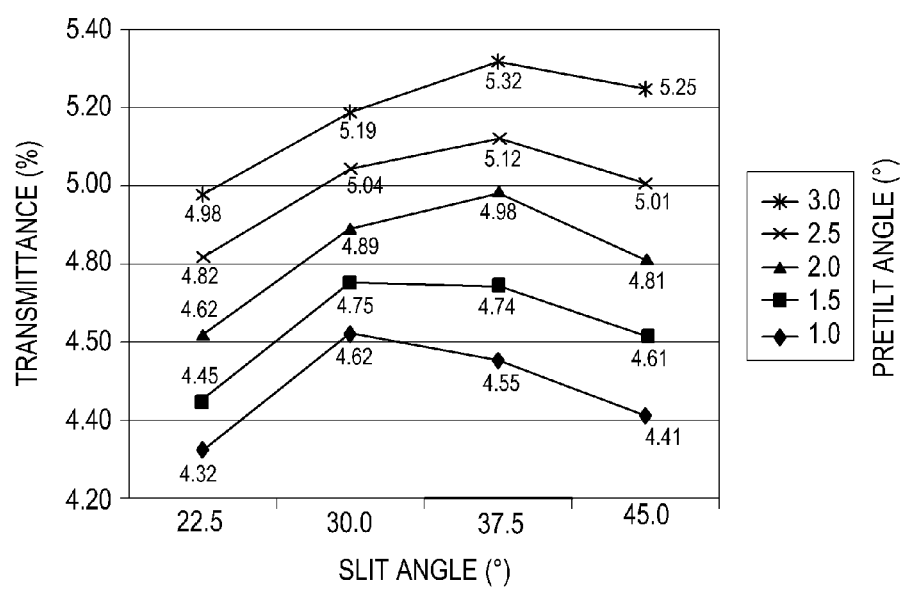
FIG. 5C is a graph illustrating transmittance of a liquid crystal display panel having unit pixels, to which the first substrate in FIGS. 5A and 5B is applied.

FIG. 5C is a slit angle-transmittance graph of a liquid crystal display panel with a unit pixel having the first substrate in FIG. 5A. For pretilt angles of the first and second alignment layers 110 and 120, i.e., pretilt angles within a range of 1.0° to 3.0°, which are used to obtain the slit angle-transmittance graph of FIG. 5C, the measured transmittances are shown with an increase of slit angles 509 to 22.5°, 30.0°, 37.5°, and 45.0°. A transmittance of a unit pixel represents a percentage determined by dividing the amount of light output from a liquid crystal display panel with the unit pixel by the amount of light input to the liquid crystal display panel. The transmittance of a unit pixel was measured when the highest-gradation level voltage, which is represented in Table 1, and at which the maximum amount of light can pass through the liquid crystal display panel, was applied to the unit pixel.

As can be appreciated from FIG. 5C, transmittance of a unit pixel tends to increase when a slit angle of a pixel electrode of the unit pixel is less than 45°, regardless of pretilt angles of alignment layers of the unit pixel. In addition, the transmittances have their maximum values at specific slit angles less than 45°, for all pretilt angles of the alignment layers in the indicated range. Therefore, the transmittance is higher when the slit angle of the pixel electrode of the unit pixel is less than 45°.

When a pretilt angle of an alignment layers of a unit pixel is 1.0°, the transmittances at slit angles between about 25° and 45° were higher than the transmittance at a slit angle of 45°. If the pretilt angles of the alignment layers of the liquid crystal display panel manufactured using the above-referenced photoalignment process technology are reduced below 1.0°, it is difficult to maintain the pretilt angle of the alignment layer-adjacent liquid crystal molecules.

In addition, if the pretilt angles of the alignment layers of the liquid crystal display panel manufactured using the photoalignment process technology increase over 3.0°, the liquid crystal display panel may suffer from display quality problems such as a domain boundary texture phenomenon in which luminance decreases at a domain boundary of a unit pixel, a black afterimage phenomenon in which transition from black gradation to white gradation is difficult, and a gradation inversion phenomenon in which luminance appears lower than that at a lower gradation level at the highest gradation level.

Although it may be difficult to maintain the pre-tilt angle of the alignment layer-adjacent liquid crystal molecules when the pre-tilt angles are less than 1 degree, and although the liquid crystal display panel may suffer from display quality problems when the pre-tilt angles are greater than 3 degrees, the slit angle range of less than 45 degrees, for example from about 30 degrees to about 37.5 degrees, is useful and works at all pre-tilt angles.

Therefore, according to embodiments of the present invention, the slit angle of the slits of the unit pixel is less than 45°. For example, to obtain higher transmittances, the slit angle of the slits in the pixel electrode may be within a range of about 30.0° and about 37.5°.

Figure 6:
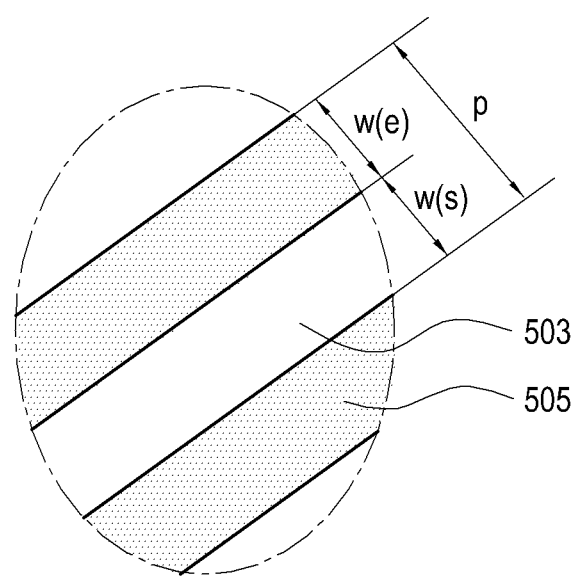
FIG. 6 is an enlarged view of region VI(a) in FIG. 5A.

Although it has been described that, in the case where a sum (hereinafter referred to as a 'slit pitch') of a slit width and a slit electrode width of the above-described micro pixel electrodes 560 and 570 illustrated in FIG. 5A is 7 µm, a specific range of the slit angles improves transmittance, widths of the slits and slit electrodes are also relevant for improving transmittance. FIG. 6 is an enlarged view of a region VI(a) in FIG. 5A and illustrates a slit 503, a slit electrode 505, and a slit pitch 'p' of the pixel electrode formed in a unit pixel. Transmittances obtained for different slit pitches 'p' are illustrated in FIG. 7.

Figure 7:
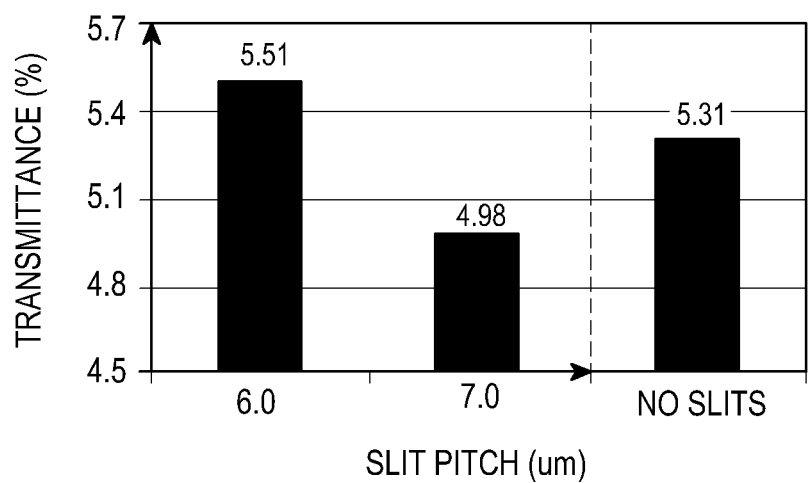
FIG. 7 is a graph illustrating slit pitches applied to the pixel electrode illustrated in FIG. 5A in relation to transmittance of the unit pixel to which the slit pitches are applied.

FIG. 7 is a graph illustrating relationships between transmittances and different slit pitches 'p' of the pixel electrode of the unit pixel illustrated in FIGS. 5A and 6. According to an embodiment, the slit pitches of unit pixels, used for measurements, are 6 and 7 µm, and the slits and slit electrodes are equal in width. For other conditions of the unit pixels, reference can be made to the details presented in Table 1. To analyze the effects made on the transmittances by the pitch or by the slit widths, transmittance of a unit pixel with a pixel electrode, in which no slits are formed, is also shown in FIG. 7.

Referring to FIG. 7, compared to a unit pixel with no slits in its pixel electrode, a unit pixel with a slit pitch 'p' of a pixel electrode of 6.0 µm, and a slit width w(s) of 3.0 µm, exhibits greater transmittance than a unit pixel with a slit pitch 'p' of a pixel electrode of 7.0 µm, and a slit width w(s) of 3.5 µm. Therefore, according to an embodiment of the present invention, for a liquid crystal display panel having transmittance higher than that of a liquid crystal display panel with no slits in a pixel electrode, a slit pitch 'p' is about 6.0 µm, and a slit width w(s) is about 3.0 µm. Alternatively, according to another embodiment of the present invention, although processing or photolithography equipment to manufacture pixel electrodes having a slit pitch less than 6.0 μm may not be available, pixel electrodes having a slit pitch 'p' less than 6.0 μm are also useful to improve transmittance of the unit pixel.

Figure 8:
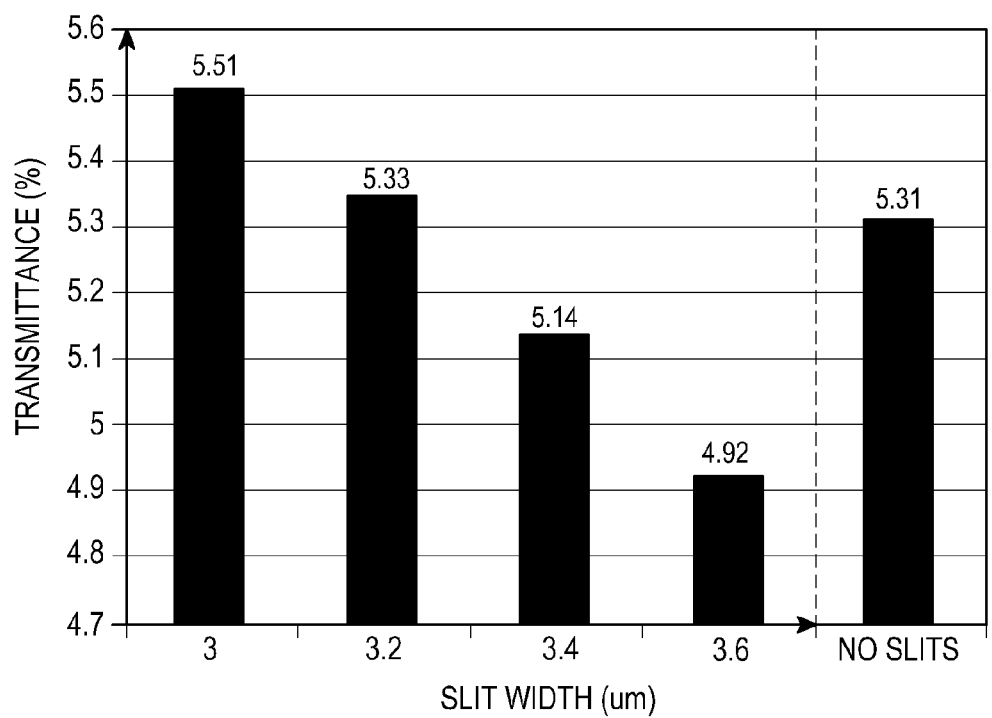
FIG. 8 is a graph illustrating various slit widths applied to the pixel electrode illustrated in FIG. 5A, and corresponding transmittances of the unit pixel to which the widths are applied.

Transmittances of unit pixels having pixel electrodes, to which various different slit widths are applied, are shown as illustrated in FIG. 8. FIG. 8 is a graph illustrating different slit widths applied to the pixel electrode illustrated in FIG. 5A, and the corresponding transmittances of unit pixels, to which the slit widths are applied. Transmittances are shown at widths of the slits 503 in the pixel electrode from 3.0 μm to 3.6 μm at increments of 0.2 μm. Like FIG. 7 described above, this graph also illustrates transmittance of a unit pixel with no slits in its pixel electrode for the purpose of comparison.

As can be understood from FIG. 8, in accordance with embodiments of the present invention, slit widths of unit pixels are inversely proportional to transmittances of the unit pixels, and unit pixels whose slit widths are less than or equal to 3.2 μm exhibit greater in transmittance than unit pixels with no slits in pixel electrodes. On the other hand, unit pixels with slit widths greater than 3.2 μm (e.g., 3.4 μm and 3.6 μm) exhibited less transmittance than unit pixels with no slits in pixel electrodes. Therefore, according to an embodiment of the present invention, the slit width of the pixel electrode is less than or equal to about 3.2 μm.

Figure 9:
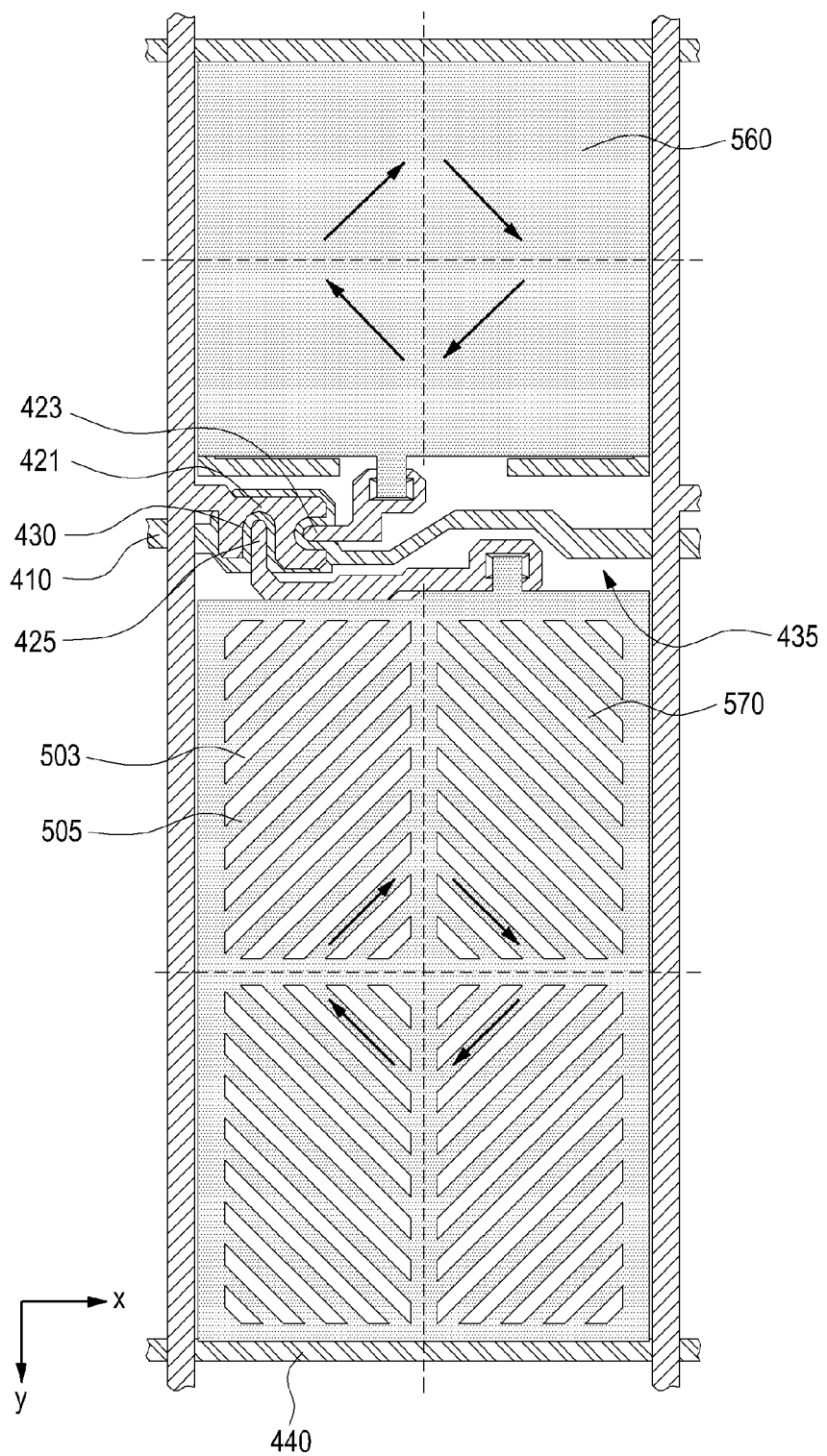
FIG. 9 is a plan view of a first substrate of a unit pixel in which slits are applied only to some micro pixel electrodes of the unit pixel, according to an embodiment of the present invention.

Compared with FIG. 5A, FIG. 9 illustrates an example of a unit pixel that does not have the second thin film transistor 433 and the down capacitor 441 and does not include slits in a first pixel electrode 560. According to an embodiment of the present invention, the exclusion of the second thin film transistor 433 and the down capacitor 441 reduces the area of a voltage applying region 435 and increases the area of the pixel electrode by the reduced area of the voltage applying region, providing another way to improve transmittance of the unit pixel. In addition, the down capacitor which may generate a relatively high amount of heat is not used in the unit pixel of FIG. 9, preventing degradation of the liquid crystal display panel.

In accordance with other embodiments of the present invention, transmittance or visibility of a unit pixel may be changed by modifying the layout or shape of slits in the pixel electrode.

FIGS. 10A to 10F are enlarged schematic plan views of first substrates of unit pixels, whose slits are disposed in various locations of a pixel electrode according to embodiments of the present invention. These embodiments include modified pixel electrodes of unit pixels illustrated in FIGS. 3A, 5A and 9, which may improve transmittance, reduce gradation inversion, decrease domain boundary texture, and improve visibility. For convenience of description, voltage applying circuits, such as a gate electrode, a data electrode, a storage electrode and a thin film transistor included in a unit pixel, are not illustrated in FIGS. 10A-10F. In addition, a black matrix and a color filter on a second substrate, which faces a first substrate of a pixel electrode, will also be omitted.

Figure 10A:
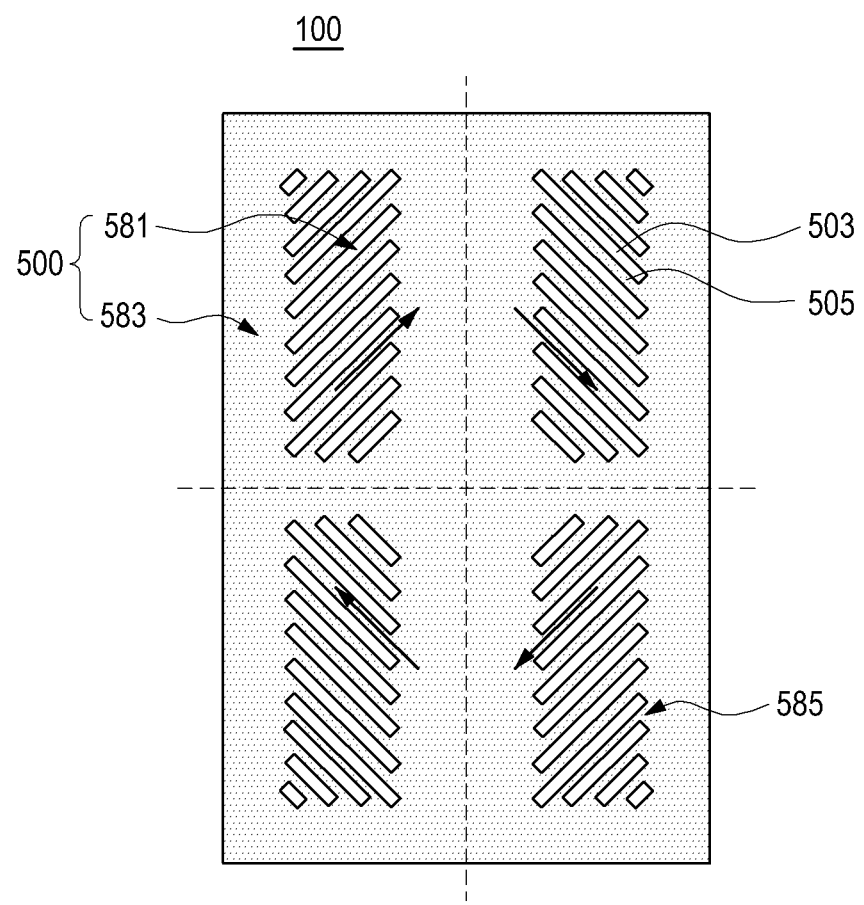
FIGS. 10A to 10F are plan views of a first substrate of a unit pixel, illustrating slits arranged in various locations, according to embodiments of the present invention.

FIG. 10A is an enlarged schematic plan view of a first substrate of a unit pixel, in which a pixel electrode in domains of the unit pixel is divided into slit regions and non-slit regions. Slit regions 581 are regions where slits 503 are disposed in a concentrated configuration, whereas non-slit regions 583 are regions where no slits are disposed. As described above, if a gradation voltage is applied, alignment layer-adjacent liquid crystal molecules overlapping the slits 503 in the slit regions 581 are aligned differently from alignment layer-adjacent liquid crystal molecules on the pixel electrode in the non-slit regions 583, and liquid crystal molecules in the slit region 581 and liquid crystal molecules in the non-slit region 583 are differently aligned in each domain of the unit pixel. In addition, it can be understood by those of ordinary skill in the art that since a single pixel voltage is applied to a pixel electrode 500 of a unit pixel 100 illustrated in FIG. 10A, the area for a thin film transistor and various kinds of signal electrodes can be reduced and the area for the pixel electrode 500 can be increased, thereby further improving transmittance.

The slit regions 581 of the pixel electrode illustrated in FIG. 10A are disposed in central portions of domains, and widths and slit angles of their slits 503 may vary. A ratio of the area of the slits regions 581 to the area of the non-slit regions 583 of the pixel electrode 500 can also be varied to improve transmittance, reduce gradation inversion, and improve viewing angle characteristics under specified design conditions so that high-quality images may be viewed at various different angles of the liquid crystal display panel. It can be understood by those of ordinary skill in the art that adjusting the area of the slit regions and the widths of the slits in various ways as described above may be applied not only to the embodiment of FIG. 10A, but also to slit regions or slits in the above/below-described embodiments.

Figure 10B:
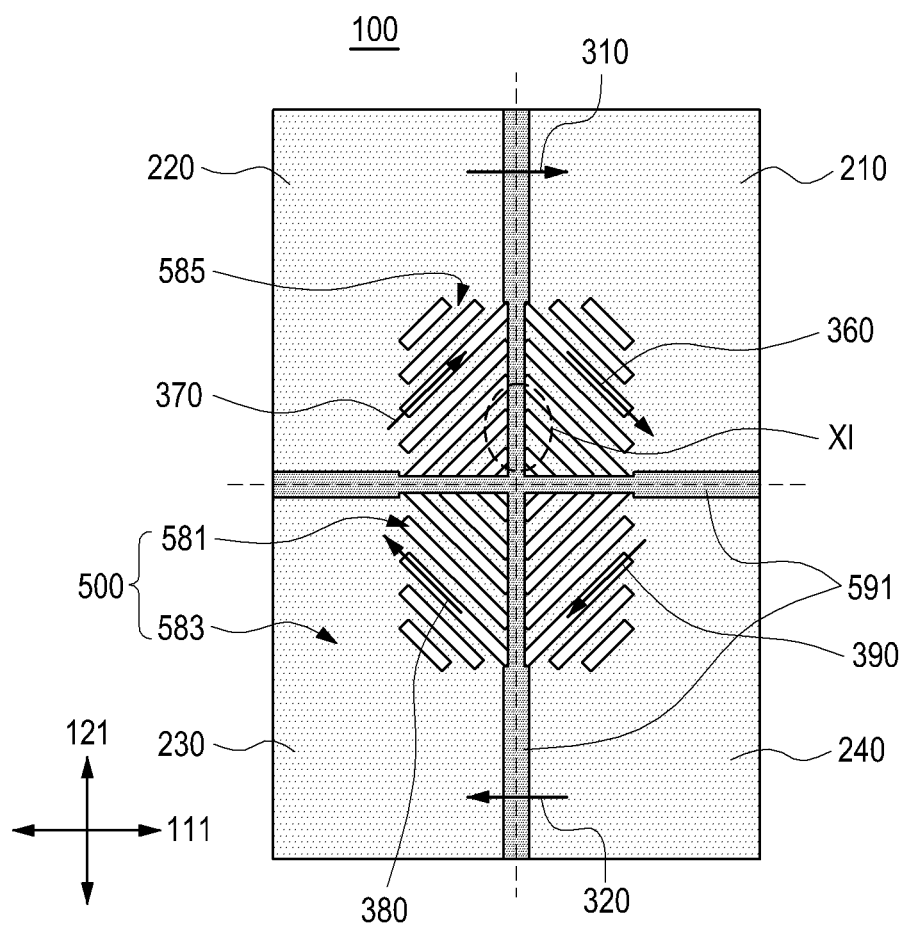

FIG. 10B is an enlarged schematic plan view of a first substrate of a unit pixel, in which a slit region 581 of the unit pixel 100 is disposed in the central portion of a pixel electrode 500. Domain boundary textures 591 are formed in portions where domains of the unit pixel are adjacent to each other, and one portion of the domain boundary texture 591 overlaps the slit region 581, while another portion overlaps a non-slit region 583. Liquid crystal molecules located over the domain boundary texture overlapping the non-slit region 583 are arranged similarly to liquid crystal molecules disposed over a common domain boundary texture region. As shown in FIG. 10B, slits 503 extend in similar directions to those of associated domain alignment vectors 360, 370, 380, and 390 crossing transmission axes 111 and 121, and liquid crystal molecules disposed in the slit region 581 are arranged in such a manner that their azimuth angles and polar angles may be dependent on the extension directions of the slits 503 and alignments of liquid crystal molecules on the slits 503, thereby increasing the amount of light passing through a domain boundary region overlapping the slit region 581, and reducing the width of the domain boundary texture.

Referring to FIGS. 10A and 10B, in a portion where the slit region 581 and the non-slit region 583 contact with each other, there exists a slit edge region 585, which has characteristics of both of the regions 581 and 583. Since liquid crystal molecules disposed over the slit edge region 585 are less affected by the directions of the domain alignment vectors than the liquid crystal molecules disposed in the slit region 581, luminance of the slit edge region 585 is lower than that of the slit region 581. Therefore, to increase transmittance of unit pixels, according to an embodiment of the present invention, the area of the slit edge region 585 is reduced. It can be understood by those of ordinary skill in the art that since the slit region 581 illustrated in FIG. 10B is concentrated in the center of the pixel electrode 500, the area of the slit edge region 585 in FIG. 10B is less than an area of slit edge region 585 in FIG. 10A.

Figure 10C:
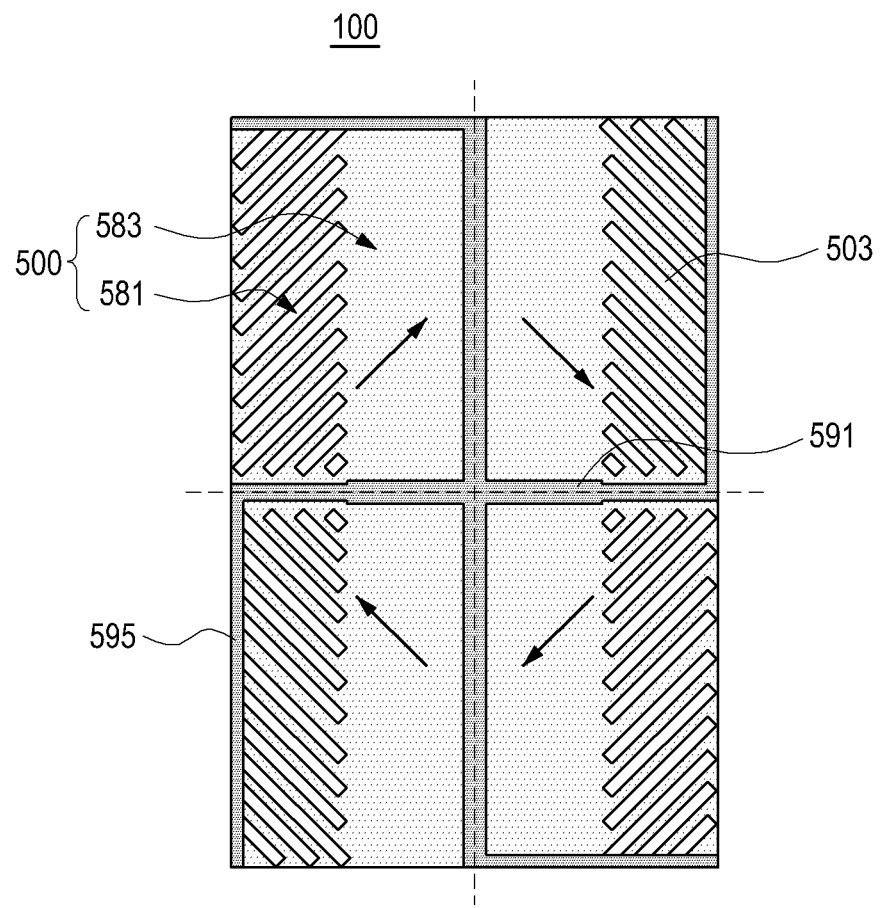

According an embodiment of the present invention, the slit region 581 may be situated not only in the central portion but also at edge portions of the pixel electrode or the domains. FIG. 10C is an enlarged schematic plan view of a first substrate of a unit pixel, in which a slit region 581 of the unit pixel 100 is disposed along a pair of long sides of the pixel electrode 500 and overlaps fringe field textures 595. Compared with liquid crystal molecules in the non-slit region 583, liquid crystal molecules in the slit region 581 have greater polar angles and their azimuth angles are more affected by the extension directions of the slits 503, thus reducing the number of liquid crystal molecules which are disposed in a fringe field formed between the edges of the pixel electrode 500 of the first substrate and a common electrode on a second substrate and reducing the number of liquid crystal molecules which are tilted with respect to the pixel electrode 500. Therefore, according to the embodiment shown in FIG. 10C, a larger amount of light may pass at the edges of the unit pixel, and an area of the fringe field textures 595 may be reduced. In addition, because the slit region 581 illustrated in FIG. 10C overlaps a portion of a domain boundary texture 591, the area of the domain boundary texture 591 may be reduced in the overlapping portion.

Figure 10D:
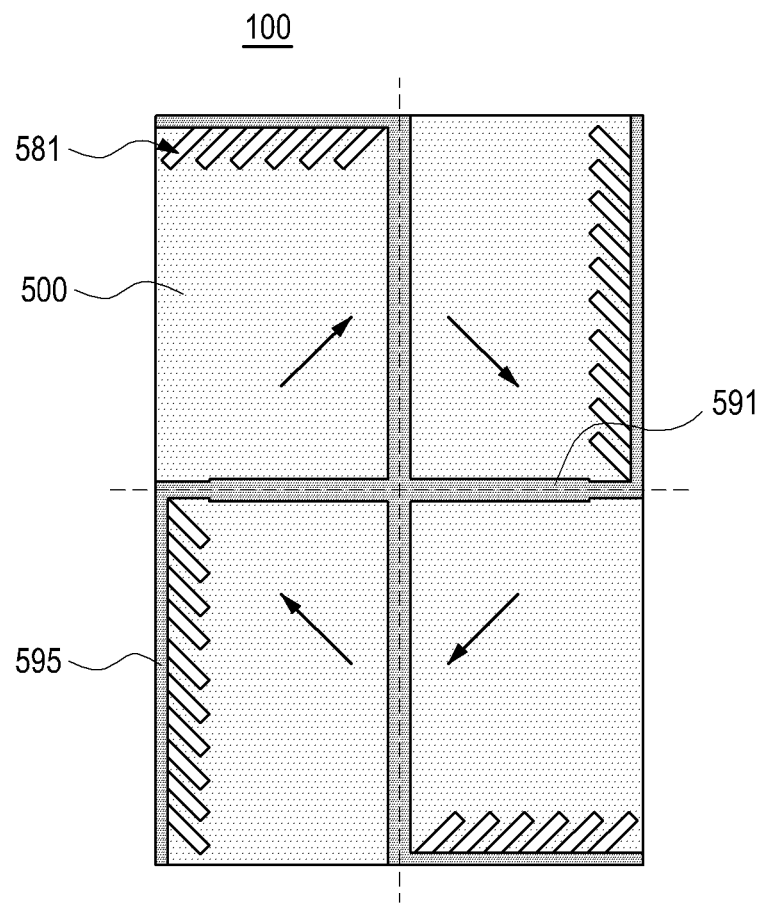
Figure 10E:
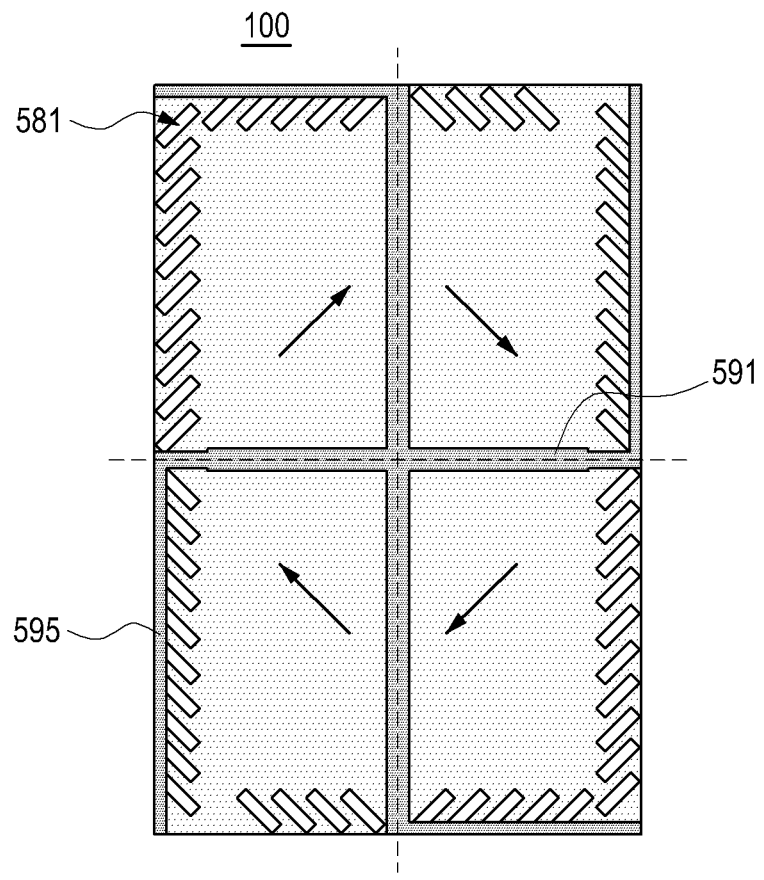
Figure 10F:
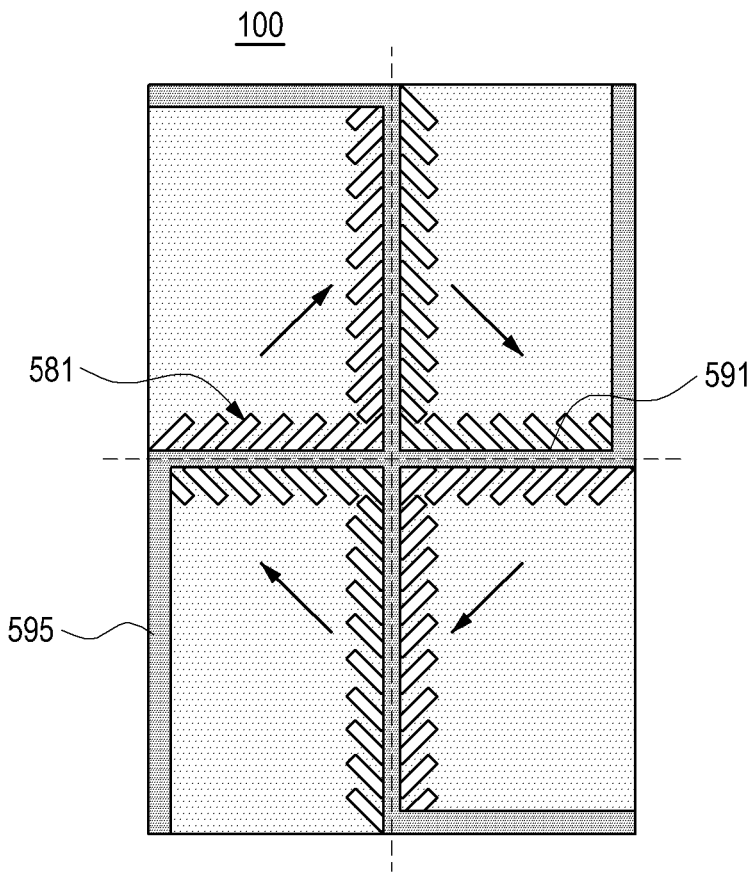

According to an embodiment of the present invention, to reduce the area of the fringe field texture 595 or the domain boundary texture 591, the slit region 581 may be disposed only in the regions where textures are formed. For example, the slit region 581 may be formed only in the regions where the fringe field textures 595 appear as illustrated in FIG. 10D or may be situated along the edges of the pixel electrode 500 as illustrated in FIG. 10E. In the alternative, the slit region 581 may be formed only in the regions where the domain boundary textures 591 appear as illustrated in FIG. 10F. In the embodiments illustrated in FIGS. 10D to 10F, when the area of the slit regions 581 is set greater than the area of the textures, widths of the textures of the unit pixel may be effectively reduced.

Figure 10G:
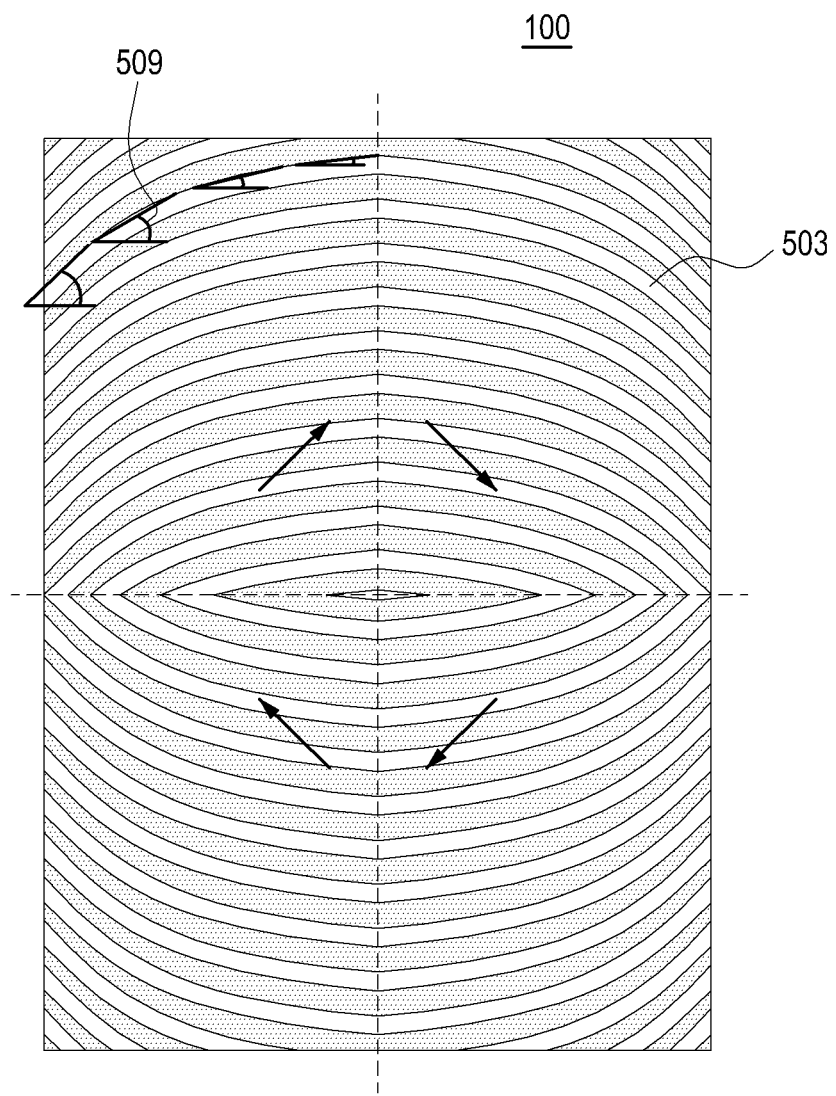
FIG. 10G is a plan view of a first substrate of a unit pixel to which various slit angles are applied, according to an embodiment of the present invention.

According to an embodiment of the present invention, plurality of slit angles may be formed in one domain. For example, slit angles 509 may be continuously changed as illustrated in FIG. 10G. To be specific, while slits 503 extend from the outer edge of a certain domain toward another domain adjacent thereto, their slit angles 509 may gradually decrease within a range less than 45°. Because the slit angles 509 are continuously changed, liquid crystal molecules overlapping the slits 503 may represent various azimuth angles for any gradation level signals, and images displayed on the liquid crystal display panel may be represented in the same quality even in various different directions. In addition, the slits 503 are formed in the domain boundary or at the edges of the pixel electrode, contributing to a reduction in the area of textures (not shown).

Although not illustrated, when a domain has various slit angles, slit angles in regions with textures may be different from slit angles in texture-less regions. For example, since the domain boundary texture is a phenomenon that occurs as liquid crystal molecules are arranged in parallel to an alignment direction of an alignment layer in a domain, a slit angle in a domain boundary texture region may be greater than a slit angle in a texture-less region. Since the slit angle is an angle at which slits cross an alignment direction of the alignment layer in the domain, an increase in the slit angle reduces the area where liquid crystal molecules are arranged in parallel to the alignment direction, i.e., reduces the area of textures.

Figure 10H:
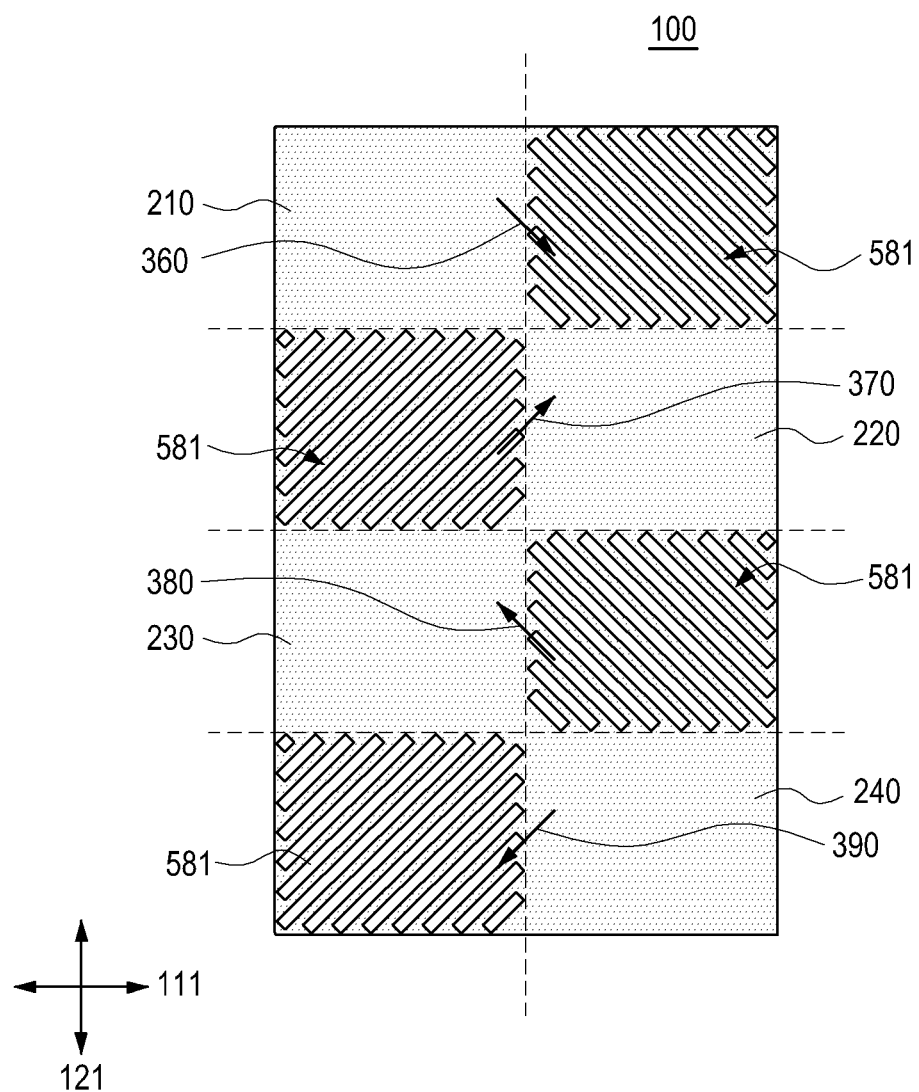
FIG. 10H is a plan view of a first substrate of a unit pixel having subsequently arranged domains, according to an embodiment of the present invention.

According to an embodiment of the present invention, domains of a unit pixel may be continuously arranged in one direction of the unit pixel, and slit regions may be formed only in some portions of the domains. FIG. 10H illustrates domains 210, 220, 230, and 240 sequentially arranged in a unit pixel 100. Domain alignment vectors 360, 370, 380, and 390, extending in different directions in the domains 210, 220, 230, and 240, respectively, have an angle of 45° with respect to transmission axes 111 and 121. The domains 210, 220, 230, and 240 have slit regions 581 including slits having slit angles less than 45°, and include a plurality of alignments of liquid crystal molecules in the domains having the same domain alignment vectors. In the unit pixel, the slit regions 581 are arranged in a zigzag configuration, i.e., arranged alternately in the vertical or column direction.

Figure 10I:
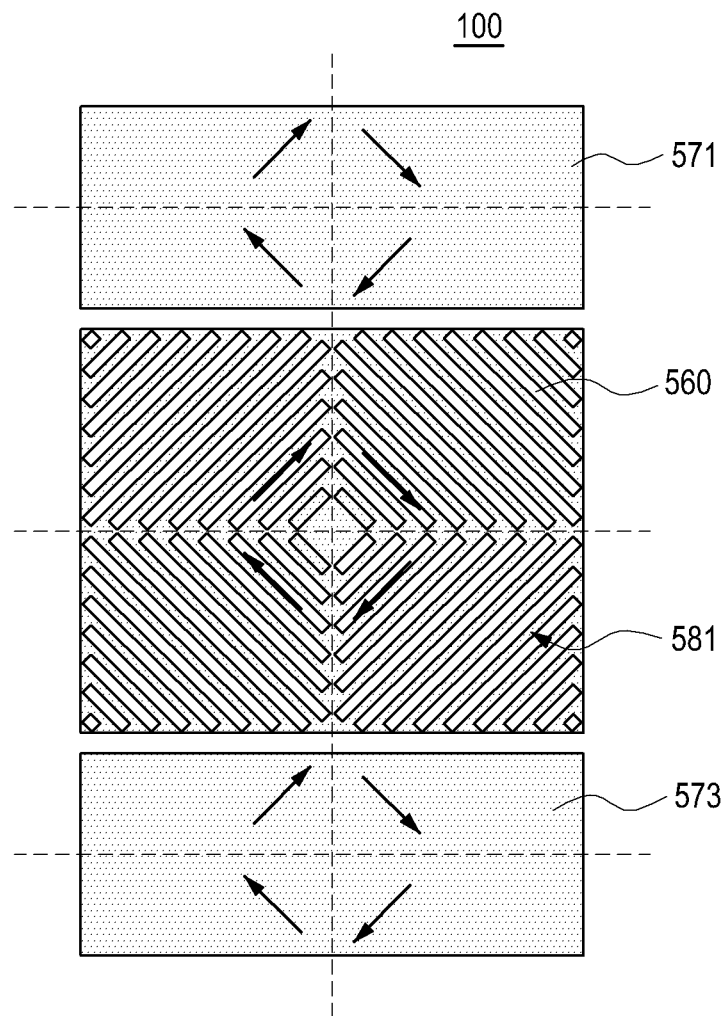
FIG. 10I is a plan view of a first substrate of a unit pixel having a plurality of micro pixel electrodes, according to an embodiment of the present invention.

Although different embodiments in which a unit pixel has one pixel electrode have been described with reference to FIGS. 10A to 10H, according to an embodiment of the present invention, a pixel electrode of a unit pixel may be divided into a plurality of micro pixel electrodes. FIG. 10I is an enlarged schematic plan view of a first substrate of a unit pixel 100 having three micro pixel electrodes 560, 571, and 573. While a slit region 581 is formed only in the central micro pixel electrode 560 in FIG. 10I, it can be understood by those of ordinary skill in the art that slits having various shapes illustrated in FIGS. 10A to 10H may be formed in the other micro pixel electrodes 571 and 573.

Figure 11:
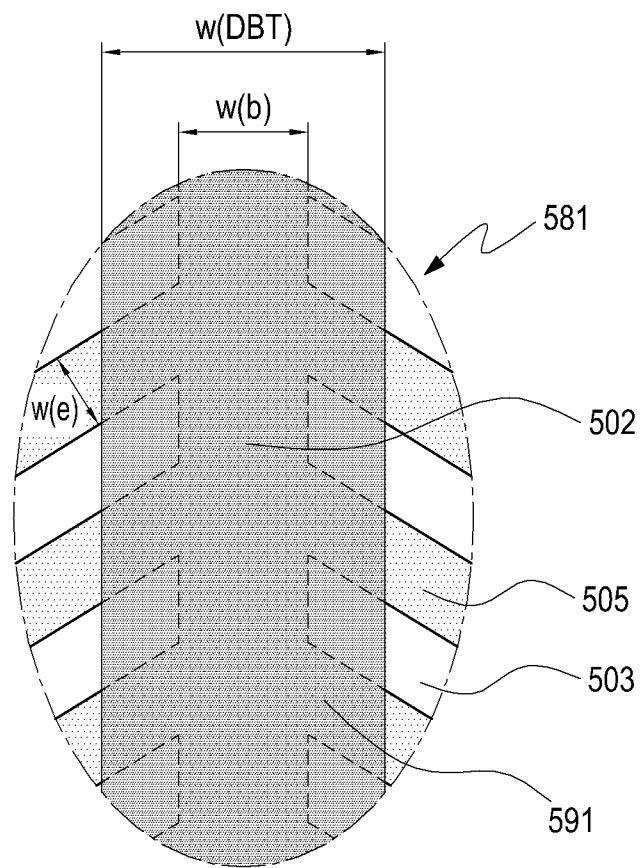
FIG. 11 is an enlarged view of region XI in FIG. 10B to illustrate a slit bridge.

FIG. 11 is an enlarged view a region XI in FIG. 10B and illustrates slits 503, slit electrodes 505, and slit bridges 502 connecting the slit electrodes 505 of a pixel electrode. A width w(b) of the slit bridge 502 connecting the slit electrodes 505 is less than a width w(DBT) of a domain boundary texture 591. The width w(DBT) of the domain boundary texture 591 is a width of a dark region, which appears in a boundary between adjacent domains. The domain boundary texture 591 has a luminance value which is less than half a difference between the maximum luminance and the minimum luminance subtracted from the maximum luminance of the adjacent domains, when the highest-gradation level voltage is applied to the unit pixel.

As described above, a width of the domain boundary texture 591 is narrower in a portion where the domain boundary texture 591 and the slit region 581 overlap than in a portion where the domain boundary texture 591 and the slit region 581 do not overlap. However, if the slit electrodes 505 in the slit region 581 overlapping the domain boundary texture 591 are separated from each other, a pixel voltage may not be smoothly applied to the slit electrodes 505, and azimuth angles and polar angles of liquid crystal molecules overlapping the slits 503 may be different from required angles, thereby reducing the effects of the narrow width of the domain boundary texture 591. Therefore, according to an embodiment of the present invention, adjacent slit electrodes or slit branches 505 are connected to each other by the slit bridge or slit stem 502 as illustrated in FIG. 11.

When a voltage is applied to the slit bridge or slit stem 502, liquid crystal molecules overlapping the portions of the slits 503 which are connected to and close to the slit bridge 502 may be arranged differently from the required alignments. So, according to an embodiment of the present invention, the width w(b) of the slit bridge 502 is to be as narrow as possible. For example, by setting the width w(b) of the slit bridge 502 to be narrower than the width w(DBT) of the domain boundary texture 591, the portion of the slits 503 which are connected to and close to the slit bridge 502 may be located within the domain boundary texture 591.

According to an embodiment of the present invention, a width w(DBT) of a domain boundary texture is about 10 μm, and a width w(b) of a slit bridge is set below 10 μm. In the alternative, the width w(b) of the slit bridge may be set as narrow as a width w(e) of a slit electrode 505, to facilitate smooth application of a voltage to the slits. In the alternative, the width w(b) of the slit bridge may have a width ranging between the width w(e) of a slit electrode and the width w(DBT) of a domain boundary texture. Given the manufacturing capabilities of a processing equipment for the liquid crystal display panel, the width w(e) of a slit electrode is about 3 μm, and the width w(b) of the slit bridge may be about 3 μm or more.

Because the slit electrodes can be separated from each other at the edges of the pixel electrode as illustrated in FIGS. 10C to 10E, according to an embodiment, adjacent slit electrodes disposed at the edges of the pixel electrode are connected so that the slit bridge may smoothly apply a voltage to the slits. Since the slit bridge can contribute to reducing a width of the fringe field texture which may be formed at the edges of the pixel electrode, the width w(b) of the slit bridge, disposed at the edge of the pixel electrode, may be set narrower than the width of the fringe field texture, similar to how the width of the slit bridge disposed in the domain boundary region is set. According to an embodiment, the width w(b) of the slit bridge may be set similar to or broader than the width w(e) of slit electrodes.

As can be appreciated from the foregoing description, the proposed unit pixel including a pixel electrode with slits fanned therein and alignment layers manufactured by photo-alignment process technology may increase in transmittance as alignment layer-adjacent liquid crystal molecules are arranged along the extension direction of the slits. A single pixel voltage is applied to a plurality of micro pixel electrodes of a unit pixel, simplifying design of the unit pixel. In addition, since liquid crystal molecules on the pixel electrodes are arranged in various directions, high-quality images may be viewed at various different angles of the liquid crystal display panel.

While the present invention has been shown and described with reference to exemplary embodiments thereof, it will be understood by those skilled in the art that various changes in form and details may be made therein without departing from the spirit and scope of the present invention as defined by the appended claims.

What is claimed is:

1. A unit pixel for a liquid crystal display panel, comprising:
   a first substrate including
   a pixel electrode and a first alignment layer on the pixel electrode;
   a second substrate disposed opposite to and spaced apart from the first substrate, said second substrate having a second alignment layer thereon;
   a liquid crystal layer disposed between the first and second substrates; and
   a plurality of domains on the pixel electrode divided by a plurality of domain alignment vectors, said domain alignment vectors produced by a plurality of alignment vectors defined by alignments of liquid crystal molecules adjacent to the first and second alignment layers, each of said domains having a plurality of slits formed in the pixel electrode,
   wherein in each domain of the plurality of domains, a slit angle is less than 45 degrees, said slit angle being defined as an angle between an alignment vector of liquid crystal molecules adjacent to the first alignment layer and an extension direction of the slits in said each domain.

2. The unit pixel of claim 1, wherein the slit angle is less than or equal to about 37.5°.

3. The unit pixel of claim 2, wherein the slit angle is greater than or equal to about 25.0°.

4. The unit pixel of claim 3, wherein the slit angle is greater than or equal to about 30.0°.

5. The unit pixel of claim 1, wherein a width of the slit is less than or equal to 3.2 um.

6. The unit pixel of claim 4, wherein a width of a slit is less than or equal to about 3.0 um.

7. A unit pixel for a liquid crystal display panel, comprising:
   a first substrate including
   a first pixel electrode and a second pixel electrode and a first alignment layer on the first and second pixel electrodes;
   a second substrate disposed opposite to and spaced apart from the first substrate, said second substrate having a second alignment layer thereon;
   a liquid crystal layer disposed between the first and second substrates; and
   a plurality of domains divided by a plurality of domain alignment vectors, said domain alignment vectors produced by a plurality of alignment vectors defined by alignments of liquid crystal molecules adjacent to the first and second alignment layers on the first and second pixel electrodes,
   wherein at least one of the first and second pixel electrodes includes slits formed therein, and another pixel electrode of the first and second pixel electrodes has no slits, and
   wherein in each domain of the plurality of domains on said at least one pixel electrode including the slits, a slit angle is less than 45 degrees, said slit angle defined as an angle between the alignment vector of liquid crystal molecules adjacent to the first alignment layer and an extension direction of the slits.

8. The unit pixel of claim 7, wherein the slit angle is less than or equal to about 37.5°.

9. The unit pixel of claim 7, wherein a width of a slit is less than or equal to about 3.2 um.

10. The unit pixel of claim 7, further comprising a thin film transistor applying a pixel voltage to both the first and second pixel electrodes.

11. The unit pixel of claim 10, wherein the thin film transistor is situated between the first and second pixel electrodes.

12. A unit pixel for a liquid crystal display panel, comprising:
   a first substrate including
   a pixel electrode and a first alignment layer on the pixel electrode;
   a second substrate disposed opposite to and spaced apart from the first substrate, said second substrate having a second alignment layer thereon;
   a liquid crystal layer disposed between the first and second substrates; and
   a plurality of domains divided by a plurality of domain alignment vectors, said domain alignment vectors produced by alignments of liquid crystal molecules adjacent to the first and second alignment layers on the pixel electrode;
   wherein each of the domains includes a plurality of slits formed in the pixel electrode, and a plurality of slit branches fanned alternately between the slits and connected with the pixel electrode, and
   wherein slits and slit branches in each of domains adjacent to one another are arranged in at least one boundary region between the adjacent domains, the slit branches being connected to a slit stem in the at least one boundary region.

13. The unit pixel of claim 12, wherein the at least one boundary region includes a domain boundary texture, and a width of the slit stem is less than a width of the domain boundary texture.

14. The unit pixel of claim 13, wherein the width of the slit stem is less than or equal to about 10 um.

15. The unit pixel of claim 14, wherein the width of the slit stem is equal to a width of a slit branch.

16. The unit pixel of claim 14, wherein the width of the slit stem ranges between a width of a slit branch and the width of the domain boundary texture.

17. The unit pixel of claim 12, wherein in each of the plurality of domains, a slit angle defined as an angle between an alignment vector of liquid crystal molecules adjacent to the first alignment layer and an extension direction of the slits, and the slit angle is less than 45°.

18. A unit pixel for a liquid crystal display panel, comprising:
- a first substrate having a pixel electrode and a first alignment layer formed on the pixel electrode;
- a second substrate spaced apart from the first substrate facing the first substrate, and having a second alignment layer formed thereon;
- a liquid crystal layer interposed between the first and second substrates;
- a plurality of domains separated by a plurality of alignment vectors formed by alignments of liquid crystal molecules adjacent to the first and second alignment layers on the pixel electrode; and
- a plurality of slits formed in the pixel electrode,
- wherein the pixel electrode includes a slit region in which the slits are formed, and a non-slit region in which the slits are not formed.

19. The unit pixel of claim 18, wherein a same pixel voltage is applied to the slit region and the non-slit region.

20. The unit pixel of claim 18, wherein the pixel electrode includes first and second micro pixel electrodes arranged spaced from each other, the slit region is formed on the first micro pixel electrode, and the non-slit region is formed on the second micro pixel electrode.

21. The unit pixel of claim 18, wherein the unit pixel includes a texture region between adjacent domains or on an edge of a domain, and the slit region overlaps the texture region.

22. The unit pixel of claim 21, wherein a width of the texture region is less than a width of the slit region.

23. A unit pixel for a liquid crystal display panel, comprising:
- a substrate;
- a pixel electrode on the substrate;
- an alignment layer on the pixel electrode; and
- a plurality of domains on the pixel electrode;
- wherein each of the domains of the plurality of domains includes a plurality of slits formed in the pixel electrode, and a plurality of slit electrodes formed alternately between the slits, and
- wherein in each domain, a slit angle is less than 45 degrees, said slit angle being defined as an angle between an alignment vector of liquid crystal molecules adjacent to the first alignment layer and an extension direction of the slits in each domain.

24. The unit pixel of claim 23, wherein a slit pitch in each domain is less than or equal to about 6 μm, and is defined as a sum of a slit width and a slit electrode width.

* * * * *